(12) United States Patent
Binstead

(10) Patent No.: US 9,035,903 B2
(45) Date of Patent: May 19, 2015

(54) TOUCH SENSOR

(76) Inventor: Ronald Peter Binstead, Nottingham (GB)

( * ) Notice: Subject to any disclaimer, the term of this patent is extended or adjusted under 35 U.S.C. 154(b) by 272 days.

(21) Appl. No.: 13/388,742

(22) PCT Filed: Aug. 6, 2010

(86) PCT No.: PCT/GB2010/001489
§ 371 (c)(1),
(2), (4) Date: Apr. 11, 2012

(87) PCT Pub. No.: WO2011/015827
PCT Pub. Date: Feb. 10, 2011

(65) Prior Publication Data
US 2012/0188201 A1 Jul. 26, 2012

(30) Foreign Application Priority Data
Aug. 6, 2009 (GB) .................................. 0913734.0

(51) Int. Cl.
G06F 3/045 (2006.01)
G06F 3/044 (2006.01)
G06F 3/041 (2006.01)
G06F 3/046 (2006.01)

(52) U.S. Cl.
CPC .............. *G06F 3/044* (2013.01); *G06F 3/0416* (2013.01); *G06F 3/046* (2013.01); *G06F 3/041* (2013.01)

(58) Field of Classification Search
CPC ....... G06F 3/045; G06F 3/041; G06F 3/0416; G06F 3/044; G06F 3/046; G08C 21/00

USPC ............ 345/173, 174, 179; 178/18.01, 18.03, 178/18–18.08, 19.01, 19.035; 341/20, 33
See application file for complete search history.

(56) References Cited

U.S. PATENT DOCUMENTS

| 4,954,823 | A | * | 9/1990 | Binstead | 341/26 |
|---|---|---|---|---|---|
| 5,149,919 | A | * | 9/1992 | Greanias et al. | 178/18.02 |
| 5,159,159 | A | * | 10/1992 | Asher | 178/18.05 |
| 5,844,506 | A | | 12/1998 | Binstead | |
| 6,137,427 | A | | 10/2000 | Binstead | |
| 7,956,847 | B2 | * | 6/2011 | Christie | 345/173 |
| 8,355,009 | B2 | * | 1/2013 | McDermid | 345/174 |
| 8,519,965 | B2 | * | 8/2013 | Cady et al. | 345/173 |
| 2002/0093491 | A1 | * | 7/2002 | Gillespie et al. | 345/173 |
| 2003/0098858 | A1 | * | 5/2003 | Perski et al. | 345/173 |
| 2004/0119701 | A1 | * | 6/2004 | Mulligan et al. | 345/173 |
| 2006/0026535 | A1 | * | 2/2006 | Hotelling et al. | 715/863 |

(Continued)

FOREIGN PATENT DOCUMENTS

| EP | 2071434 | 6/2009 |
|---|---|---|
| JP | 2009098942 | 5/2009 |
| JP | 2009169720 | 7/2009 |

OTHER PUBLICATIONS

PCT/GB2010/001489 International Search Report and Written Opinion dated Mar. 15, 2011 (19 pages).

(Continued)

*Primary Examiner* — Joe H Cheng
(74) *Attorney, Agent, or Firm* — Michael Best & Friedrich LLP

(57) ABSTRACT

A touch sensor for sensing user input comprising one or more elements. At least a portion of one or more of the elements is configured to be desensitized, in order to determine the location of one or more user inputs.

51 Claims, 23 Drawing Sheets

(56) References Cited

U.S. PATENT DOCUMENTS

| | | | |
|---|---|---|---|
| 2006/0097991 A1* | 5/2006 | Hotelling et al. | 345/173 |
| 2006/0197752 A1* | 9/2006 | Hurst et al. | 345/173 |
| 2007/0070051 A1* | 3/2007 | Westerman et al. | 345/173 |
| 2008/0012835 A1* | 1/2008 | Rimon et al. | 345/173 |
| 2008/0122798 A1* | 5/2008 | Koshiyama et al. | 345/173 |
| 2008/0296073 A1 | 12/2008 | McDermid | |
| 2008/0309631 A1 | 12/2008 | Westerman et al. | |
| 2009/0027068 A1* | 1/2009 | Philipp et al. | 324/678 |
| 2009/0174675 A1 | 7/2009 | Gillespie et al. | |
| 2010/0097346 A1* | 4/2010 | Sleeman | 345/174 |
| 2010/0127992 A1* | 5/2010 | Schmid | 345/173 |
| 2011/0001722 A1* | 1/2011 | Newman et al. | 345/174 |
| 2011/0187677 A1* | 8/2011 | Hotelling et al. | 345/174 |
| 2012/0162131 A1* | 6/2012 | Perski et al. | 345/174 |

OTHER PUBLICATIONS

United Kingdom Intellectual Property Office Examination Report for Application No. GB1201909.7 dated Sep. 3, 2014 (3 pages).

United Kingdom Intellectual Property Office Report of Telephone Conversation for Application No. GB1201909.7 dated Sep. 11, 2014 (1 page).

United Kingdom Intellectual Property Office Examination Report for Application No. GB1201909.7 dated Sep. 13, 2013 (3 pages).

United Kingdom Intellectual Property Office Examination Report for Application No. GB1201909.7 dated Apr. 28, 2014 (3 pages).

Mexican Patent Office Action for Application No. MX/A/2012/001585 dated Jun. 26, 2013 (5 pages—with English Translation).

Japanese Patent Office Action for Application No. 2012-523381 dated Jun. 6, 2014 (7 pages—English Translation).

Chinese Patent Office Action for Application No. 201080044039.3 dated Apr. 1, 2014 (7 pages—English Translation).

Australian Patent Office First Examination Report for Application No. 2010280532 dated Mar. 18, 2013 (5 pages).

Australian Patent Office Second Examination Report for Application No. 2010280532 dated May 13, 2014 (5 pages).

* cited by examiner

Front view of screen, showing eight horizontal driven elements (y), and eight vertical sensing elements (x).

Seven of the drive elements are shown connected to ground while the eighth is connected to the Active Backplane.

F0 to F9 show ten hypothetical simultaneous touch finger positions.

Touch sensitive areas shown by — ⫽

Section a-b view from Fig 3, showing eight driven horizontal elements (y), and one vertical sensing element (x4).

Seven of the drive elements are shown connected to ground while the eighth is connected to the Active Backplane.

Touch sensitive areas shown by — ⫽ ← 624

Relationship between x touch sensing element, y element mask and finger.

Figure 10

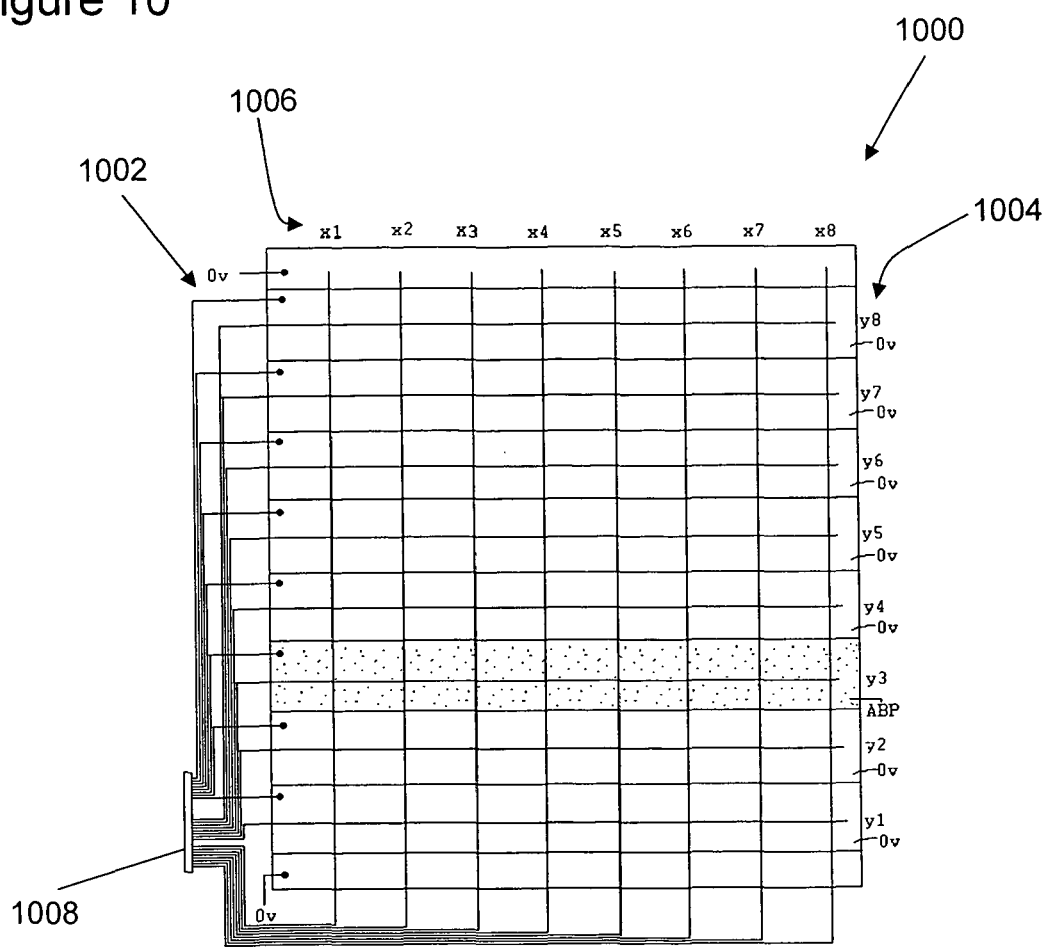

Front view of screen showing eight horizontal plate type driven elements, eight horizontal wire sensing elements, y, and eight vertical wire sensing elements, x .

In mask mode, seven of the horizontal plate elements are connected to ground, while the eighth is connected to the Active Backplane, ABP .

In x/y multiplexed mode, all eight horizontal plate elements are connected to the Active Backplane.

Single capacitance touch sensitive element in front of
an eight element electronically switchable mask.

All of the switch elements are shown connected to ground (0v),
through resistors, while one at a time is connected to the Active
Backplane (ABP).
Touch sensitive areas shown by -

Touch sensing switch.
Single capacitance touch sensitive element in front of
a single mechanically or electronically switchable mask element.

Touch sensitive areas shown by - ⁄⁄,

Typical x and y values generated by a screen as in Fig 3, used in standard x/y multiplexed mode.

Typical x values generated by a screen, as in Fig 3, used in masked mode.

View of screen showing eight y driving/sensing wires and eight x sensing/driving wires View of screen showing eight y driving/sensing wires and eight x sensing/driving wires, patterned to maximise the capacitance cross coupling between the x and y wires.

View of screen showing eight y driving/sensing wires and eight x sensing/driving wires, patterned to maximise the capacitance cross coupling between the x and y wires.

View of screen with eight vertical, x, driven elements and eight horizontal fine wire, y, sensing elements.

Hatched area x3 is shown connected to the active backplane while all non hatched x elements are connected to ground (0v).

TOUCH SENSOR

CROSS-REFERENCE TO RELATED APPLICATIONS

This application is a national stage filing under 35 U.S.C. 371 of International Application No. PCT/GB2010/001489, filed Aug. 6, 2010, which claims foreign priority benefits to United Kingdom Patent Application No. 0913734.0, filed Aug. 6, 2009. These applications are incorporated herein by reference in their entireties.

The present disclosure relates to the field of touch sensors, and particularly, although not exclusively, touch sensors that can distinguish between multiple simultaneous user inputs/touches.

Touch sensors, which may also be referred to as touch screens, that use multiplexed arrays of horizontal and vertical sensor elements, are known as described in U.S. Pat. No. 6,137,427 (Binstead) for example. Such touch sensors work well with one finger operation, where one peak is identified by elements in the horizontal direction (x) and one peak is identified in the vertical direction (y). In this example, the location of the touch can be unambiguously determined as an x/y finger co-ordinate by putting together the single peak in the horizontal direction and the single peak in the vertical direction.

However, prior art multiplexed arrays have problems with correctly detecting the location of two simultaneous finger presses, as there will be two peaks in the horizontal (x) direction and two peaks in the vertical direction (y). The problem is how to identify which x peak is associated with which y peak, and is illustrated in FIG. 1a.

FIG. 1a illustrates schematically a prior art multiplexed 64 position touch sensor with sixteen sensing elements/inputs. Eight sensing elements are provided along the horizontal (x) axis of the touch sensor, and are labelled with reference 102. Eight sensing elements are provided along vertical (y) axis of the touch sensor, and are labelled with reference 104. The eight horizontal sensing elements 102 and eight vertical sensing elements 104 provide 64 touch sensing cross-over points/intersections.

Shown in FIG. 1a are two finger presses: finger F0 108 at a location of intersect ion 5/3 of the x/y sensing elements; and finger F1 106 at a location of intersect ion 7/6 of the x/y sensing elements. The information returned by the horizontal sensing elements 102 is shown graphically with reference 110 in FIG. 1a, and the information returned by the vertical sensing elements 104 is shown graphically with reference 112. It can be seen that the information 110 returned by the horizontal sensing elements 102 shows two "peaks" at horizontal locations 5 and 7, and the information 112 returned by the vertical sensing elements 104 shows two "peaks" at vertical locations 3 and 6.

Using the information 110, 112 returned by the horizontal and vertical sensors 102, 104 results in an ambiguity as it cannot be determined if the fingers are at locations 5/3 and 7/6 (which are the correct locations of the fingers) or at locations 5/6 and 7/3. Insufficient data is available, with a normal x/y multiplexed scan, to determine the correct finger positions.

The problem of ambiguity gets worse with three or more fingers, or when several fingers are held still on a common sensor element and one finger starts to move. Knowing which of the fingers is moving can be difficult to resolve.

One known way around these problems is to use a non-multiplexed array of sensing elements, such as the one shown in FIG. 1b.

The touch sensor 150 of FIG. 1b is made up of a number of discrete keys 152, each of which is sensitive to touch and has its own independent sensing input. Thirty two sensing inputs are shown with reference 154 in FIG. 1b and correspond to the thirty two keys 152 on the left-hand side of the touch sensor 150, and thirty two sensing inputs are shown with reference 156 in FIG. 1b and correspond to the thirty two keys 152 on the right-hand side of the touch sensor 150. The two fingers, F0 (160) and F1 (158), are uniquely identified as being at inputs 56 and 42 respectively. Therefore, the non-multiplexed array of FIG. 1b is capable of detecting the position of a number of fingers at the same time, without ambiguity.

A problem with the non-multiplexed approach of FIG. 1b is the large number of sensing elements required (one sensing element per key 152), and the complexity of connections to these elements. The 8×8 multiplexed array of FIG. 1a requires 16 sensing elements (eight in the x direction and eight in the y direction), whereas the non-multiplexed equivalent of FIG. 1b requires 64 sensing elements (one per key 152). It will be appreciated that a 32×32 multiplexed array requires 64 inputs, whereas its non-multiplexed equivalent requires 1024 sensing elements, each of which require connection to an electronic controller.

Another problem with 64 non-multiplexed separate sensing elements (FIG. 1b), is that each of the 64 elements require a conductive route back to the controller electronics, with the conductive route for most of the elements having to traverse the viewing/sensing area. Apart from visually obscuring the screen, these tracks have a small negative impact on detection accuracy.

The listing or discussion of a prior-published document or any background in the specification should not necessarily be taken as an acknowledgement that the document or background is part of the state of the art or is common general knowledge.

In the following description, the terms grounded, disable, and desensitize are examples of words that are used to describe a principle of desensitizing part of an element, and can include using a control element to desensitize part of a sensing element.

"Grounding" may include, connecting to true ground, or earth potential, connecting to another fixed potential, connecting to a fixed, but floating potential (for example when equipment is battery operated), connecting to an anti-active backplane signal or other interfering signal.

The terms ungrounded, enable, and sensitize are examples of words that are used to describe a principle that includes sensitizing part of a sensing element, "Ungrounding" may include connecting to an active backplane signal or allowing an element to float, i.e., not be resistively connected to anything.

According to a first aspect of the invention, there is provided a touch sensor comprising:
  one or more elements;
   wherein at least a portion of the one or more elements is configured to be desensitized in order to determine the location of one or more user inputs.

Desensitizing at least a portion of one or more of the elements can be considered as providing a mask to the touch sensor such that the location of one or more user inputs can be determined. Desensitizing at least a portion of one or more of the elements can enable fewer sensing inputs to be required in order to unambiguously determine the locations of one or more user inputs.

At least a portion of the one or more elements may be configured to be desensitized in order to distinguish between multiple user inputs. The elements may be linear or nonlinear.

The touch sensor may be one or more of a capacitive touch sensor, or an inductive sensor, a resistive sensor, or any other type of sensor. In some examples, the touch sensor may use a combination of different sensor technologies.

The one or more elements may comprise one or more sensing elements. At least a portion of one or more of the sensing elements may be configured to be capacitively coupled to ground to be desensitized. At least a portion of one or more of the sensing elements may be configured to be capacitively, inductively or resistively coupled to ground to be disabled. The sensing element may be coupled to ground in the same way that the sensor senses touch; for example, a capacitive touch sensor may have sensing elements that are capacitively coupled to ground to be desensitized. In other embodiments, the portion(s) of the one or more sensing elements may be configured to be coupled to a fixed voltage, an anti-backplane signal, or any other signal that is not an active backplane signal, in order to be desensitized. At least a portion of one or more of the sensing elements may be configured to be coupled to an active backplane signal to be sensitized. The touch sensor may comprise a switch configured to couple the sensing element to either ground or the active backplane.

At least a portion of one or more of the sensing elements may be configured to be coupled to an element that is electrically floating to be sensitized. "Electrically floating" may be considered as not being connected to ground, or an active backplane signal, or any other terminal. The touch sensor may comprise a switch configured to couple the sensing element to ground or to an element that is electrically floating.

The touch sensor may comprise one or more controllable elements. A region of a controllable element may be proximal to a region of a sensing element in order to provide a sensing region of the sensing element.

The one or more sensing elements may be aligned in a different direction to the one or more controllable elements such that the sensing elements and controllable elements intersect in order to provide the sensing region.

At least part of the one or more sensing elements may be aligned in substantially the same direction as, and proximal to, at least part of one or more of the controllable elements in order to provide the sensing region.

Use of controllable elements and sensing elements can enable fewer sensing inputs to be required than is necessary for the prior art. The touch sensor may comprise x sensing inputs, where x equals the number of sensing elements, which may be the number of columns or the number of rows of the touch sensor, for example.

Embodiments of the invention can enable sensing elements to only be required for one dimension of a two-dimensional touch sensor. User input along the first dimension can be distinguished by the sensing elements; and user input along the second dimension can be distinguished by sensitizing or desensitizing parts of these sensing elements, which may be performed sequentially. Sensitizing or desensitizing parts of the sensing elements can be performed by enabling or disabling one or more of the controllable elements The direction of the sensing elements may be substantially perpendicular to the direction of the controllable elements, for keypad or touchscreen applications for example. For other applications, the arrangement may be more complex or customised.

The controllable elements may be configured to be disabled/grounded such that the sensing regions are either sensitized or desensitized.

The touch sensor may be configured to couple a controllable element to ground in order to desensitize the corresponding sensing regions. The corresponding sensing regions of the one or more sensing elements can be desensitized as they are capacitively coupled to the controllable element that is coupled to ground.

The touch sensor may be configured to leave a controllable element electrically floating in order to enable the full sensitivity of the corresponding sensing regions.

The touch sensor may comprise a switch configured to couple a controllable element to ground in order to disable the corresponding sensing regions; or leave the controllable element electrically floating to enable the controllable element, thereby providing full sensitivity of the sensing regions.

The touch sensor may be configured to couple a controllable element to an active backplane signal in order to enable full sensitivity of the corresponding sensing regions.

The touch sensor may comprise a switch configured to couple a controllable element to ground in order to desensitize the corresponding sensing regions, or couple the controllable element to the active backplane signal to sensitize the corresponding sensing regions.

There may be a switch for each controllable element.

The switch, or switches, may be electronic switches. In this way, operation of the touch sensor can be automatically operated and can provide a responsive touch sensor.

The touch sensor may comprise a controller. The controller may be configured to operate the switch, or switches, in accordance with information received from one or more of the sensing elements.

The controller may be configured to operate these switches in order to periodically disable/ground one or more of the controllable elements or otherwise control the controllable elements. If one, or only a few, controllable elements are disabled/grounded at the same time, then this can be considered as providing a narrow mask. The controller may be configured to operate the switches, or otherwise control the controllable elements, in order to periodically disable/ground all except one of the controllable elements. The controller may be configured to enable a single controllable element in turn. This can be considered as providing a broad mask.

The controller may be configured to determine which of the controllable elements should be disabled/grounded in order to distinguish between multiple user inputs represented by the signals returned from one or more of the sensing elements.

The controller may be configured to disable/ground a previously enabled controllable element that intersects with a sensing element at a location that corresponds to a location of one of the multiple user inputs. The controller may be configured to control a controllable element in order to desensitize a previously sensitized corresponding sensing region that corresponds to a location of one of multiple user inputs. For example, if user input is received at locations corresponding to two different enabled controllable elements, then the controller can ground/disable one of the previously enabled controllable elements such that the two user inputs can be distinguished.

The controller may be configured to operate all elements as sensing elements until multiple user inputs are received, or until multiple user inputs are not distinguishable from each other. The controller may then operate one or more of the elements as controllable elements in order to distinguish between multiple user inputs.

The controller may be configured to control the controllable elements in order to sensitize all of the sensing elements, and the controller may be configured to repeatedly:

receive information from the sensing elements; and in response to the information received from the sensing elements, control the controllable elements in order to desensitize corresponding sensing regions;

until multiple user input is distinguishable.

The controller may be configured to ground a former/previously sensing element at a location that corresponds to one of multiple user inputs. The controller may be configured to change the operation of an element from a sensing element to a controllable element in order to distinguish between multiple user inputs. For example, if user input is received at locations corresponding to two different sensing x inputs, or two different sensing y inputs, then the controller can use/operate one of these sensing elements as a controllable element and ground/disable it, so that the two user inputs can be distinguished.

All of the sensing elements may also be configured as controllable elements, and the controller may be configured to control the controllable elements such that a single sensing region between two controllable elements is configured to be touch sensitive.

The signals returned from one or more of the sensing elements may be received when none of the controllable elements are disabled/grounded. A scan when none of the controllable elements are disabled/grounded may be referred to as an x/y scan, and may involve all of the elements being used as sensing elements. Such an example can provide for fast operation to detect when a finger touches the screen. A disambiguating scan may only be performed (only considered necessary) when two or more fingers touch the screen.

The controller may be configured to enable all of the controllable elements and the controller is then configured to repeatedly:

receive information from the sensing elements; and in response to the information received from the sensing inputs, ground various combinations of these elements and/or increase or decrease the number of disabled controllable elements until multiple user input is distinguishable.

This an example of how a mask can be gradually increased in size until multiple user input is distinguishable, and may enable successive approximation and binary chopping to be performed.

In some embodiments, one or more of the elements may never be used to sense touch, but are permanently configured as controllable (masking) elements. The controllable elements may be connected either to ground or to the active backplane, and this can enable multiple user inputs to be efficiently distinguished with less sensor elements.

In other embodiments, one or more of the sensing elements can be configured to be both sensing elements and controlling elements, and, at different times, will be either one or the other.

In some embodiments, all of the elements may be controller elements, with a single, universal sensor element. The controller may be configured to periodically disable/ground all except two of the controllable elements such that a single intersection between the two enabled/ungrounded controllable elements is configured to be touch sensitive. The two controllable elements that are not disabled may extend in different directions, for example they may be orthogonal to each other.

In an example where both row elements and column elements can be, alternately, both control and sensing elements, and either the row elements are sensing elements while the column elements are control elements, or the column elements are sensing elements while the row elements are control elements, then one sensing element; and one control element can be selected, sequentially, one after another, so that it is possible to unambiguously sense each intersection between a row and column element. Thus, for an 8×8 sensor pad, each of the 64 intersections can be sensed separately. All of the sensing inputs can be routed to a single sensing input circuit, as only one of the sensing elements will be enabled at a time.

As both the sensing methods described above (that is, a row sensing with column controlling method/scan, and a column sensing with row controlling method/scan) measure the same thing, but in two different ways, then the two sensing methods can be used to improve the accuracy of the detection. The results of one scan can be compared with the results of the other scan to determine whether or not they represent the same user inputs, thereby increasing confidence in the results. Alternatively, both results can be combined together to produce a composite result, with greater accuracy. This can be considered, in effect, as similar to "double-entry" bookkeeping.

Alternatively, if a whole row, or column of elements is to be sensed at exactly the same time, then one sensing input circuit will be required for each of the rows or columns. This will require the number of inputs to equal to the number of rows plus the number of columns. This would be 16 for an example 8×8 sensor pad. In the example described in this paragraph, however, rows and columns are never both used as sensors at the same time, so, this number can be decreased by routing row and column inputs to a common bank of inputs circuits. This would require the number of inputs to be equal to the greater of the row or column numbers, which is 8 for an 8×8 sensor pad. In these examples, all of the sensing inputs can be routed to a single sensing input circuit, as only one of the sensing elements can be enabled at a time.

A compromise between the two extremes of having a separate input circuit for each input, and one input circuit to serve all of the inputs, is to have a small bank of input circuits that can be sensed at the exact same time, such as four, for example. Row or a column inputs can be routed to this common bank of four input sensors circuits.

The sensing elements and controllable elements may be wire elements. A portion of a sensing element may follow a path that is substantially parallel to, and substantially adjacent to, a portion of a controllable element in a region of the touch sensor such that the portions of the sensing element and controllable element that correspond with each other provide sensing regions.

The controller may be configured to control the controllable elements such that all of the sensing elements are sensitized when no user input, or a single user input, is received.

The controller may be configured to enable all of the controllable elements to act as sensing inputs when no touch has been detected. In some embodiments, the controller may enable all of the controllable elements to remain as sensing inputs even when sensing input representative of a single user input is received, as this is not an ambiguous situation. In this way, the touch sensor can be used efficiently in terms of processing resources and response time as "masking", for example by grounding selected elements, is only performed as, and when, required.

The controller may be configured to implement one of a plurality of modes of operation in accordance with the information received from the one or more sensing elements, the touch sensor comprising x elements extending in a first direction and y elements extending in a second direction. The modes of operation can include one or more of:

Both x and y elements are sensing elements, sensing all inputs;

Both x and y elements are sensing elements, tracking a finger already detected in a previous scan;

X elements are sensing elements and the y elements are controllable elements, scanning all inputs;

Y elements are sensing elements and x elements are controllable elements, scanning all inputs;

The above two modes alternating;

X elements are sensing elements and the y elements are controlling elements, tracking a finger, or fingers, already detected in a previous scan;

Y elements are sensing elements and x elements are controlling elements, scanning a finger, or fingers, already detected in a previous scan;

Controllable elements may mask by grounding one element only;

Controllable elements may mask by grounding all but one element only:

Controllable elements may mask by grounding blocks of elements;

Controllable elements may mask by grounding all but a block of elements;

Blocks of elements may be masked in a successive approximation mode;

Blocks of elements may be masked in a sequential mode;

Blocks of elements may be masked in an order dependent on the results of the previous scan;

X and some y elements may be controllable elements while the remaining y element(s) is/are sensing;

Y and some x elements may be controllable elements while the remaining x element(s) is/are sensing.

A sensing element may comprise a strip of metal or wire (or any conductor) connected to a touch detection circuit.

The sensing and/or controllable elements may be wide enough so that they abut each other, but do not make electrical contact with each other, and may cover the entire screen.

The one or more elements may be configured to determine user input using Dynamic or projected capacitance.

There may be provided a touch sensor comprising a wire, cable or any other electrical connector connected to one or more elements. The wire, cable or electrical connector may connect the element to a sensing circuit, for example. The touch sensor may also comprise a shield provided in proximity to the wire such that the wire is not sensitive to touch. The shield may be provided to, optionally controllably, desensitize the wire such that any manually interference with the wire does not affect the touch sensing that is performed by the one or more elements. The shield may be a grounded wire, or any other grounded electrical conductor. It will be appreciated that embodiments that comprise the shield need not necessarily have elements that are configured to be desensitized, as the advantages associated with the shield may be achievable independently of desensitizing elements.

The touch sensor may comprise a controller, and the one or more elements may comprise a first set of one or more elements and a second set of one or more elements. Both the first set and second set of elements may be configured to be operable as both sensing and controlling elements. The controller may be configured to determine a preliminary location of one or more user inputs using the first set of elements as sensing elements and the second set of elements as controllable elements, and determine a secondary location of one or more user inputs using the first set of elements as controllable elements and the second set of elements as sensing elements.

The controller may be further configured to determine a composite location of the one or more user inputs in accordance with the preliminary location and the secondary location. Such embodiments may provide particular advantages for wire elements where capacitive coupling between the elements may be limited. Either or both of the first and second sets of elements may comprise one or more elements.

There may be provided an electronic device comprising any touch sensor disclosed herein. The electronic device can be a small or very large touchscreen, a foldable "paper thin" touch inter-active e-reader, a mobile telephone, personal digital assistant, laptop computer or juke box, where the case and/or the screen are touch interactive, a touch inter-active concrete tablet, wooden work surface, wall-paper, floor tiles, electronic multi-user gaming tables, interactive conference tables, control panels or any device requiring a single or multi-user touch interactive surface.

Any touch sensor disclosed herein may be configured to operate through glass, for example a shop window, including a double gazed window.

According to a further aspect of the invention, there is provided a method of operating a touch sensor, the touch sensor comprising a one or more elements, the method comprising:

desensitizing at least a portion of the one or more elements in order to determine the location of one or more user inputs.

There may be provided a computer program, which when run on a computer, causes the computer to configure any apparatus, including a touch sensor, device, or touch screen, or perform any method disclosed herein.

The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

A description is now given, by way of example only, with reference to the accompanying drawings, in which:

FIG. 10 shows a maskable touch screen according to an embodiment of the invention;

One or more embodiments disclosed herein relate to a touch sensor for sensing user input. The touch sensor comprises one or more elements, and parts of one or more of the elements are configured to be desensitized in order to determine the location of user input, and possibly to distinguish between multiple simultaneous user inputs. Such touch sensors may be referred to as masked touch sensors. There are different ways in which the elements can be desensitized, as described in more detail below, and in some embodiments, elements may be referred to as "driven elements" or "controllable elements" as they can be driven or switched either to ground or to an active backplane signal by a controller in order to sensitize and desensitize corresponding sensing elements. Such controllable elements may, also be usable as sensing elements when they are not being used as controllable elements.

Figure 2:
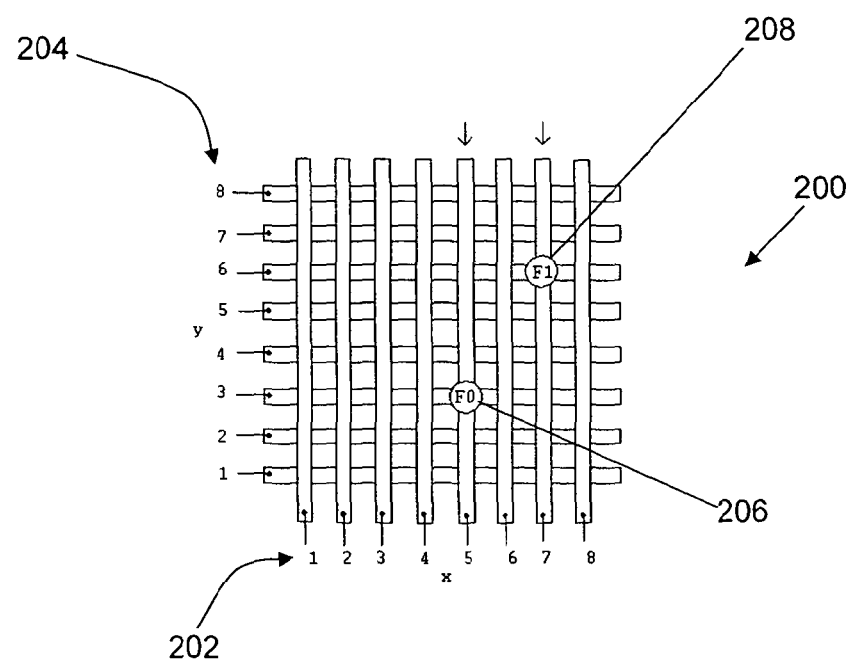
FIG. 2 illustrates a touch sensor according to an embodiment of the invention.

FIG. 2 illustrates a touch sensor 200 according to an embodiment of the invention. The touch sensor comprises eight elements 204 that are spaced along a vertical (y) dimension of the touch sensor 200, and eight elements 202 that are spaced along a horizontal (x) dimension of the touch sensor 200. Each of the vertical elements 204 extend in a horizontal direction, although will be referred to as vertical elements as they are spaced apart in a vertical direction. A similar naming convention is used for the horizontal elements 202.

In this example, the vertical elements 204 can be disabled in order to distinguish between multiple user inputs. The vertical elements can be referred to as "driven elements" or "controllable elements".

The horizontal elements 202 in the example of FIG. 2 are sensing inputs that are configured to identify the location of user input in the horizontal (x) direction.

Also shown in FIG. 2 are two finger presses (F0 206 and F1 208) representative of user input. The first finger press F0 206 is at location 5,3 and the second finger press F1 208 is at location 7,6. As discussed above, a prior art multiplexed array would not be able to unambiguously determine the location of the two finger presses 206, 208. In FIG. 2, the two fingers could be at four possible locations, 5/6, 5/3, 7/6 or 7/3.

When a controllable element 204 is grounded/disabled, then none of the intersections between that controllable element 204 and all of the sensing elements 202 generate an output representative of a touch. That is, all of the regions of the sensing elements 202 that intersect with the grounded controllable element 204 are desensitized. Embodiments of the invention can ground a controllable element 204 that is associated with the vertical location of a finger press, so that the output generated by the sensing elements 202 no longer includes data representative of the finger press on the grounded controllable element 204. In FIG. 2, grounding the controllable element y6 eliminates the ability of any of the sensing elements to detect a finger along this element, so finger F1 208 is undetectable. Finger press (F0 206) however, is still detectable, without ambiguity, at the intersection with controllable element y3. Finger F0 is, therefore at location 5/3 and so, F1 must, therefore, be at location 7/6. For an example with two simultaneous finger presses, only one controllable element needs to be grounded to be able to unambiguously determine the locations of the finger presses. It will be appreciated that different numbers of controllable elements 204 may need to be grounded, possibly at different times, in order to unambiguously distinguish between more than two simultaneous finger presses.

More detailed examples of how the driven elements 204 can be used to distinguish between multiple user inputs are provided below.

In some of the examples described herein, disabling an element may be described as grounding the element. As described elsewhere herein, grounding is not the only way of disabling an element, and it should be appreciated that any examples that are disclosed that refer to grounding an element can also be provided with a different means for disabling the element. For example, disabling an element may be implemented by resistively or capacitively connecting a conductive element to true ground or earth, to a floating ground which is used as a universal ground reference, or to a fixed voltage, which may or may not be zero volts. As an alternative, an anti-active backplane signal can be used to desensitize a sensing element, and the anti-active backplane signal may be identical to an active backplane signal but exactly 180 degrees out of phase with it. Similarly, an enabled element may be referred to as an "ungrounded" element.

With one or more of the methods according to an embodiment of the invention, only 16 conductors need to be routed to the controller for a 64 element array, and none of the conductive routes may have to traverse the viewing area.

Figure 1A:
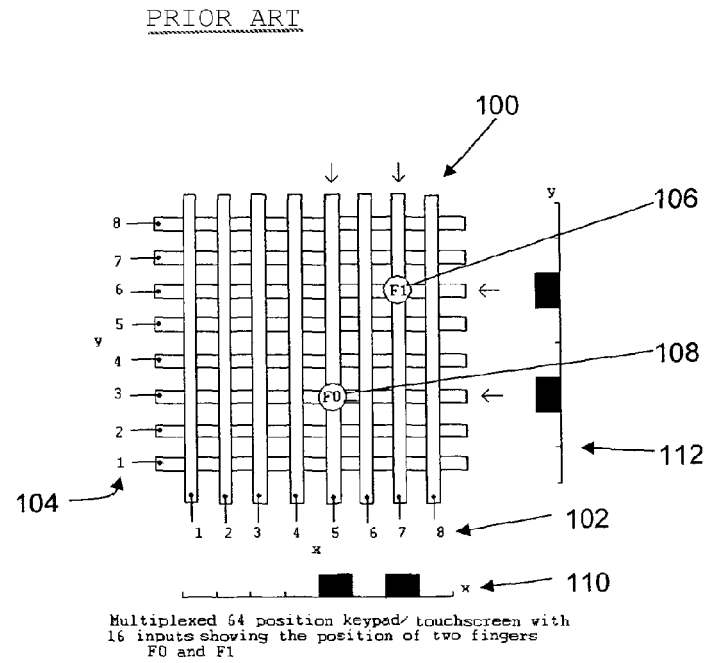
FIGS. 1a and 1b illustrate prior art touch sensors.

Under the prior art multiplexed arrangement, as in FIG. 1a, when a vertical sensor element is touched, it is not possible to determine whereabouts on that element the finger has touched without information from the horizontal sensor elements. This disclosure describes, however, how it is possible to sensitize or desensitize, selectively, parts of that vertical element, so that a small section only, is sensitive, or a small section only, is insensitive, and how it is possible, under electronic control, to move that sensitive/insensitive spot up and down that sensing element and always know exactly where that spot is, enabling the detection of the position on that element of one, or more, fingers.

Assuming that the prior art multiplexed touch sensor arrangement of FIG. 1a is configured as a simple x/y capacitance sensor, where the eight x elements and the eight y elements are all sensing inputs, it has been found that grounding any one of the y inputs will desensitize the parts of the x inputs where they cross over the grounded y element. Under a regime of dynamic capacitance detection, as described in the U.S. Pat. No. 5,844,506, only the parts of the x elements situated over the grounded y element are affected, the remainder of the x elements retaining their full sensitivity.

This effect can be further enhanced by connecting all inputs to a signal derived from the capacitance sensing signal when the sensing inputs are not being sensed or grounded. Similarly, by grounding all the y elements except one, it has been found that the whole length of the x elements are desensitized, except for the parts where they cross over the y element that was not grounded.

This phenomenon can be exploited to detect, unambiguously, the position of a number of fingers on a multiplexed touch sensor of this type.

For example, FIG. 2 shows a finger 206 touching vertical sensor element x5 at the intersection with horizontal sensing element y3. By sequentially grounding all y elements but one, and thereby sensitizing only one intersection at a time, then it is only possible to detect the finger when the option to sensitize the intersection with horizontal element 3 is selected, showing that the finger is at the intersection with horizontal element 3. When the intersection with y6 is sensitized, no finger can be detected on sensor x5.

The finger F1 would have been found by sensor element x7 when the intersection with element y6 was sensitized, but no finger would have been sensed by x7 when the intersection with y3 was sensitized.

Had both fingers been touching the vertical sensing element 5 at the same time, but at different intersections, then the presence and position of both fingers would have been sensed accurately when the associated horizontal element allowed that part of the vertical element to sense.

As an alternative to sensitizing the vertical sensing element 5, sequentially one intersection at a time at each of the eight intersections with the horizontal elements, instead this element could be desensitized sequentially one intersection at a time. The finger would be detectable at every option except when the intersection with horizontal element 3 is desensitized. It can, therefore, be deduced that the finger is at the intersection with horizontal element 3.

Had there been two fingers touching the vertical sensing element 5, both at the same time, but at different intersections, then the presence of at least one finger would always have remained detectable, and, therefore, indistinguishable by this process. As the sensing technology used, however, gives a continuously variable "strength of touch" reading, as opposed to a binary "touched or not touched" reading, then a diminution of strength of touch would have been detected when the appropriate intersection was desensitized, and this information could be used to detect the position of more than one finger. If complete desensitization was achievable, then, for two similar finger touches, the strength of signal would be diminished, or attenuated, by about 50%, for example, when one of them was masked.

Both these techniques can be used alternately, to corroborate the results of the other, or be combined to gain a higher degree of accuracy.

Under some circumstances, the vertical sensing elements and the horizontal sensing elements can be interchangeable. The vertical elements can be sensing, while the horizontal elements are sensitizing/desensitizing. Then the horizontal elements can act as sensors, while the vertical elements act as sensitizers/desensitizers. The results from both these options, also, can then be used to corroborate and/or reinforce the accuracy of detection.

FIG. 2 shows a touch sensor where the vertical and horizontal elements can be used such that they are initially both used as sensing elements to determine if any fingers are touching the screen. If more than one touch is determined in either of the sensing arrays, then the sensitizing or desensitizing process described above can be used. The process, or processes, can be used selectively around the areas of the screen where the fingers have been detected in order to eliminate ambiguous touches, rather than scanning all of the screen.

Embodiments of the present disclosure use the technique of selectively sensitizing and/or desensitizing various parts of a multiplexed keypad or touchscreen to determine, accurately and without ambiguity, the position of one or more fingers touching that keypad, or touchscreen. It can also use the same technique to eliminate the need for one of the sets of sensor elements.

The same technique can also be used in non keypad/touchscreen applications, where the sensing elements may or may not be in a regular array, but could be in a more irregular or random layout.

The method used for selectively sensitizing or desensitizing a multiplexed touchscreen can vary with the different technologies. Resistive touchscreens, which rely on mechanical movement, can use a mechanical solution, whereas inductive and capacitive touchscreens will probably, though not necessarily, use an inductive or capacitive solution, respectively.

Resistive Touch Sensors

Four and five wire resistive touchscreens rely on a mechanical contact between two conductive layers in order to detect a finger press. The conductive layers are normally kept apart by an array of very small non-conductive spacers. The potential difference between various of these wires indicates the position of the finger. More than one finger results in potential differences which are difficult to resolve in terms of finger positions. A suitably designed, electronically controllable mechanical matrix barrier could be used to prevent, or allow, selected contact to take place, thereby allowing only one finger at a time to make contact between the two conducting layers. Materials which deform under an electric current or magnetic field could be used.

Inductive Touch Sensors

Inductive touch sensors can be used with embodiments of the invention, and an example is provided below with reference to FIG. 24. It will be appreciated that features that are described herein that relate to capacitive touch sensors can also have equivalent features/functionality for inductive sensors, or any other type of sensors.

Capacitive Touch Sensors

Embodiments of the invention relate to a capacitive technique, for selectively sensitizing or desensitizing a capacitive touch sensor.

U.S. Pat. No. 4,954,823 (Binstead) discloses a very sensitive, accurate and stable method for detecting the position of a finger operating a keypad through very thick glass (U.S. Pat. No. 4,954,823). The signal, to be detected was so small that it could easily be swamped by changes in environmental conditions, such as temperature and humidity. By using information about how fingers operate a keypad or touchscreen, separating out global from local changes using other keys as references, and using changes in capacitance only, as opposed to absolute capacitance values, a very sensitive capacitance detection method was created that was immune from environmental variations. At power-up, or on a reset, a value is stored for each input, and this is used as a "no-touch" reference for that input. This value is continuously compared with the current value for that input, and slowly incremented, or decremented, to track the current value and thereby compensate for long-term drift.

This dynamic method for measuring very small changes in capacitance was later to be termed "projected capacitance" and such "projected capacitance" can be used with embodiments of the present invention.

A later patent (U.S. Pat. No. 5,844,506 (Binstead) discloses how sensing elements could be prevented from interfering with each other, through cross-coupling if they were connected to an active backplane signal when not being sensed. The active backplane signal is the same as the signal on the sensing element(s) and is, ideally, exactly in phase with it and has a similar waveform and amplitude. It does not, necessarily, have the same instantaneous potential. When compared with grounding the elements when not being sensed, it was found that the resulting touchscreen was substantially more sensitive and had significantly reduced "cross-talk" between the sensing elements. Again, these techniques can be used with embodiments of the present invention.

Under "dynamic capacitance" or "projected capacitance" detection conditions, it has been found that parts of sensing elements can be desensitized selectively, if a grounded element is run closely alongside parts of that sensing element. Parts of the same sensing element, that do not have the grounded wire next to them, but have a floating element or an element that is connected to the active backplane signal next to them can maintain their sensitivity.

When the previously grounded element is allowed to float, or is connected to an active backplane signal, then that part of the sensing element that was previously insensitive regains its sensitivity. This works for all shapes of sensing elements, whether they are linear, curved, chaotic, reticulated, dendritic, 2 or 3 dimensional, fine trace-like conductors, or simple or complicated plate-like structures, etc.

Grounding may be implemented by resistively or capacitively connecting a conductive element to true ground or earth, to a floating ground which is used as a universal ground reference which may be useful for battery operated devices, or to a fixed voltage, which may or may not be zero volts.

As an alternative to grounding, an anti-active backplane signal can be used to desensitize a sensing element. Ideally, this signal is identical to the active backplane signal but is exactly 180 degrees out of phase with it. Other interfering or desensitizing signals may also be used, but with reduced effectiveness.

Since the signals on the two plates of a standard capacitor are always identical when the active backplane signal is applied to one plate and the sensing signal is applied to the other plate, there will effectively be no capacitive coupling between the two plates. This feature is often used when sending high frequency signals down coaxial cable, the shield being driven by the active backplane signal instead of being grounded. This leads to very little attenuation of the signal even over very long lengths of cable. In a multiplexed touchscreen, the active backplane signal eliminates capacitive coupling between the various intersecting elements.

The results of these observations and experiments are used in the current disclosure.

Figure 3:
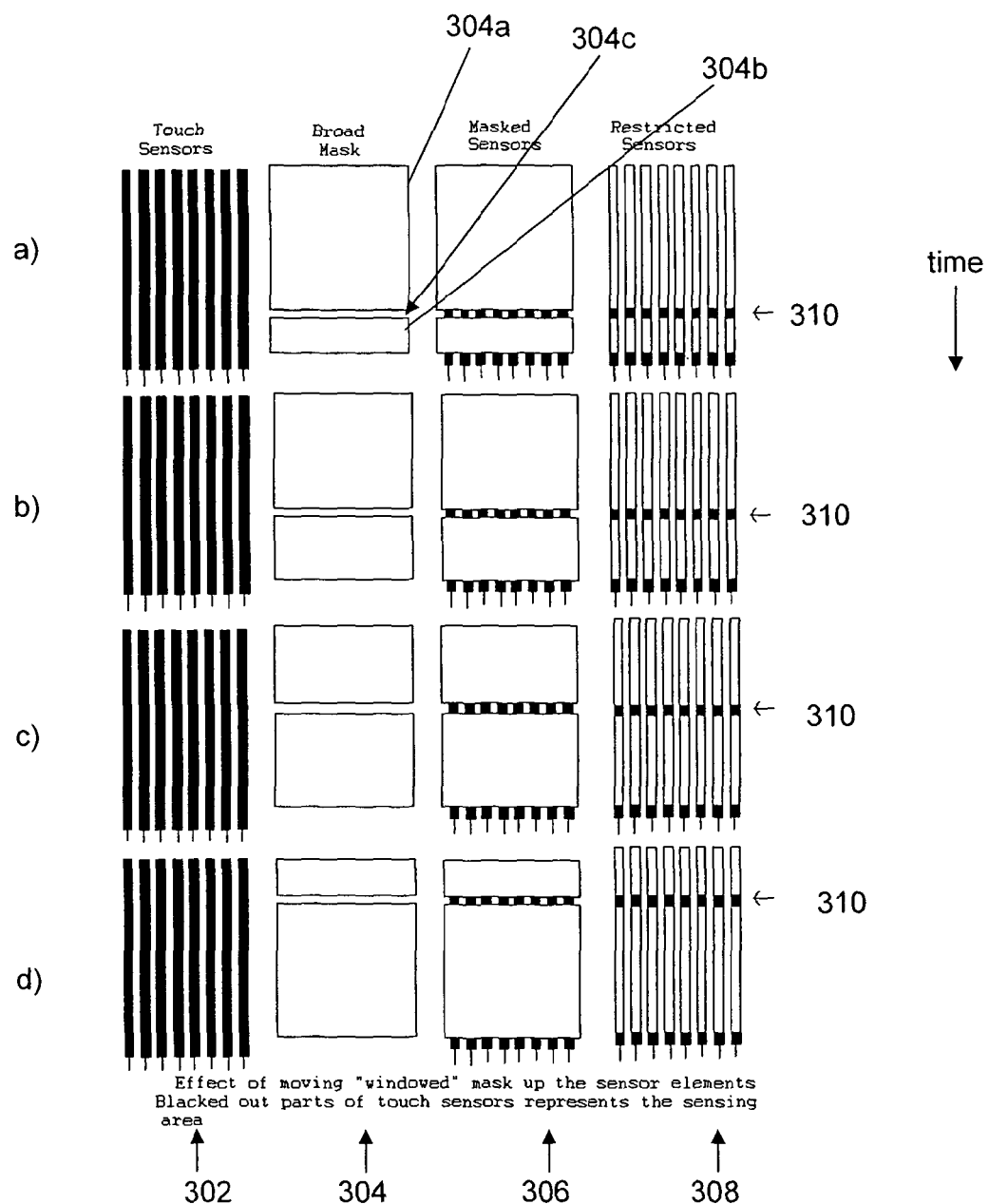
FIG. 3 illustrates how controllable elements can be used as a mask according to an embodiment of the invention.

FIG. 3 shows how controllable elements can be used as a mask to allow parts of an array of linear sensing elements to sense the proximity of a finger and inhibit other parts from sensing.

The sensing elements are shown in FIG. 3 with reference 302 and the controllable elements are shown schematically with reference 304. It will be appreciated that the sensing elements 302 and controllable elements 304 are shown separately on the left hand side of FIG. 3 for ease of illustration, and that they are positioned one on top of the other in use, as shown on the right hand side of FIG. 3.

Each of the sensing elements 302 extend in a vertical direction, and can be used to identify user input in a horizontal direction. The controllable elements 304 are shown schematically as two blocks 304a, 304b, one on top of the other, and with a gap 304c in between the two blocks 304a, 304b. The two blocks 304a, 304b represent controllable elements that are grounded, and the gap 304c represents an ungrounded controllable element. The controllable elements 304 of FIG. 3 can be considered as providing a broad mask as only one of the controllable elements is ungrounded at a time. It will be appreciated that a broad mask can also be provided by more than one controllable elements being ungrounded at the same time, for example 2, 3, or 4 controllable elements can be ungrounded at the same time and still provide a broad mask. In some examples, enabling any number or controllable elements that is less than half of the total number of controllable elements may be considered as providing a broad mask.

As shown with reference 306, the two blocks 304a, 304b of grounded controllable elements are located between the user and the sensing elements such that they apply a mask to the sensing elements. The mask restricts the sensing elements such that they only identify user input at locations 310 that correspond to the ungrounded controllable element, which is shown as the gap 304c in the mask.

In other examples, including capacitive touch sensing examples, the grounded controllable elements that form the mask can be behind the sensing elements, that is the sensing elements can be between the controllable elements and the user.

Use of controllable elements in this way can be considered as providing a mask with a window. The controllable element that is grounded can be changed over time such that the window moves up or down the sensing elements. FIGS. 3a to 3d show how the window can be moved up the sensing elements over time.

FIG. 3 shows how it is possible to replace the prior art of FIG. 1a with a simple mask that allows eight vertical sensing elements to sense many fingers on many different positions along all eight sensing elements.

Figure 4:
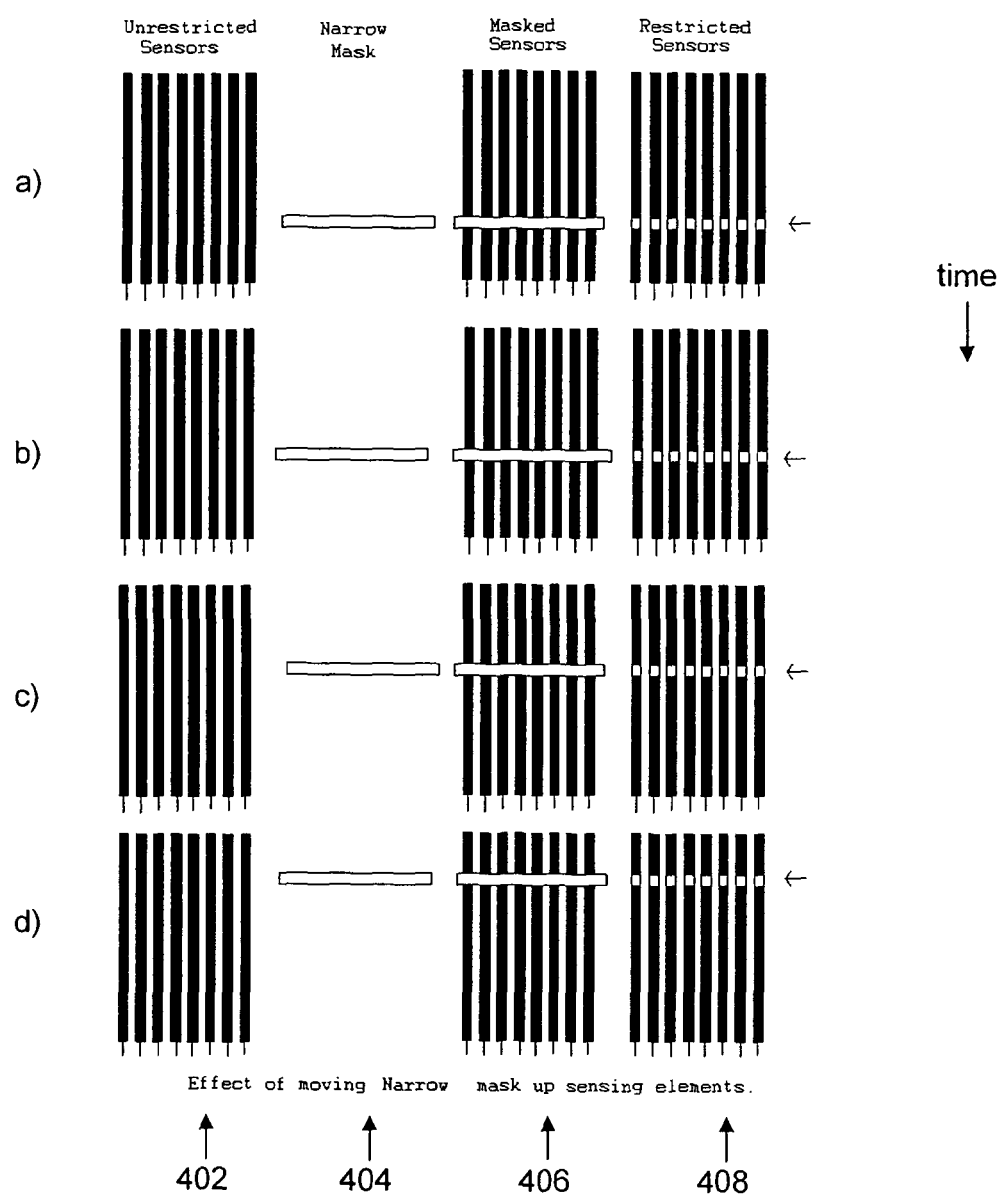
FIG. 4 illustrates how a narrow mask can be used according to an embodiment of the invention.

FIG. 4 shows how a narrow mask may be used to desensitize selected parts of a keypad/touch screen. FIG. 4 is similar to FIG. 3 and similar features are provided with reference numbers in the 400 series. FIG. 4 illustrates how just one of the controllable (y) elements 404 can be grounded, with all of the other controllable (y) elements 404 can be ungrounded.

Controllable elements may be ungrounded by connecting them to an active backplane and grounded by connecting them to a fixed universal potential, as discussed in more detail below.

With the mask of FIG. 4, only the parts of the sensing (x) elements 402 that are immediately in front of (or behind) the grounded controllable (y) element are desensitized. The majority of the sensing elements 404 remain fully touch sensitive.

This method of masking can be used advantageously for disambiguating readings resulting from a simple multiplexed scan, such as one performed by the prior art of FIG. 1a. For example, both the horizontally extending and vertically extending elements can be used as sensing elements according to a known multiplexed array as shown in FIG. 1a until it is determined that one or more user inputs are present at the same time. When more than one user input is determined, then a sensing element that identifies a user input may be used as a controllable element and grounded so as to provide information that can be used to distinguish/disambiguate between the multiple user inputs.

It will be appreciated that a narrow mask can also be provided by more than one controllable element being grounded at the same time, for example 2, 3, or 4 controllable elements can be grounded at the same time and still provide a narrow mask. In some examples, grounding any number or controllable elements that is less than half of the total number of controllable elements may be considered as providing a narrow mask.

Figure 5:
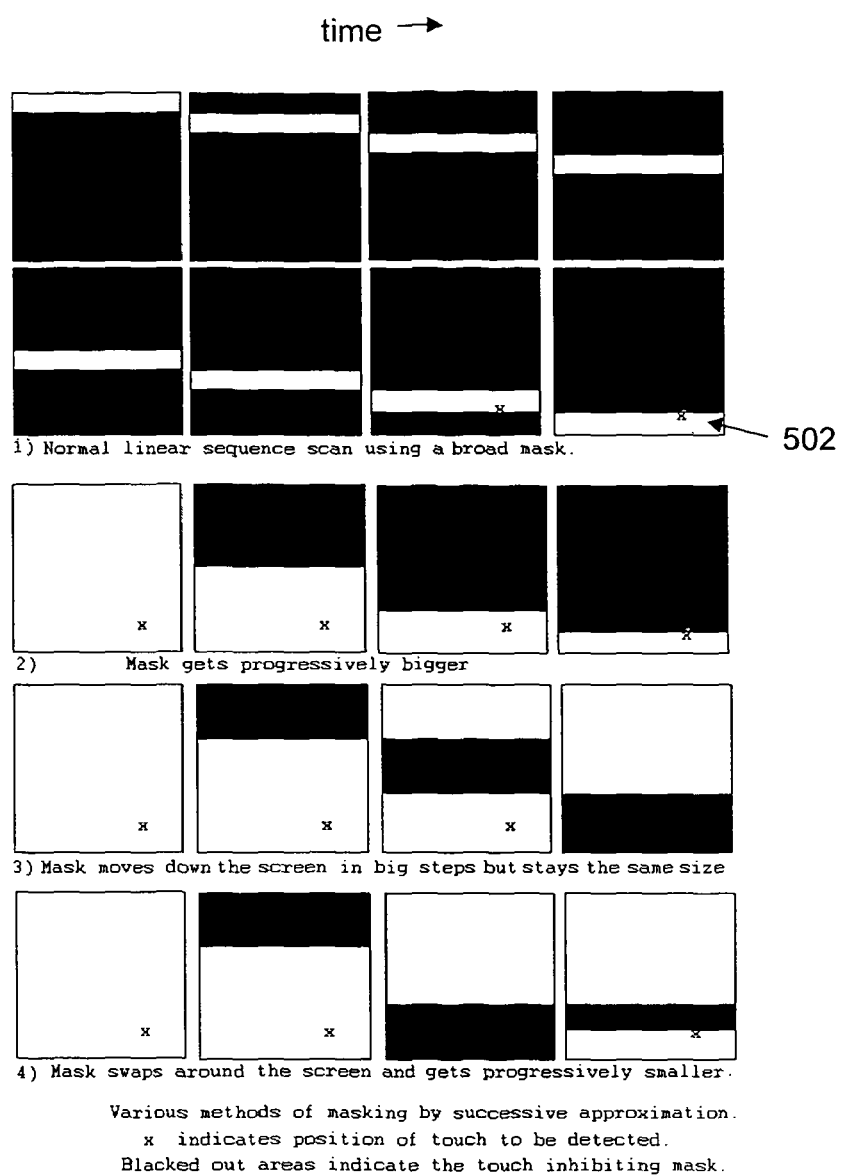
FIG. 5 illustrates four different ways of applying a mask according to an embodiment of the invention.

FIG. 5 illustrates four different ways of applying a mask that is provided by enabling and disabling controllable elements. It will be appreciated that vertically extending sensing elements and horizontally extending controllable elements are present in a similar way to FIGS. 3 and 4.

In FIG. 5, grounded controllable elements are shown in black and enabled controllable elements are shown in white. Time is shown as passing from left to right such that a mask immediately follows the mask on its right. In the fifth example (5/1), however, the fifth of the eight masks starts again at the left side of the page. An "x" 502 is shown in FIG. 5, and represents the user input to be detected.

FIG. 5(2) shows masking used in a few large blocks, each block covering a different part of the screen. Instead of grounding one controllable (y) element at a time sequentially, it is possible to save time by grounding in blocks, and determining the position of the user input/touch by successive approximation, or "binary chopping". The top half may be grounded and the bottom half ungrounded, to determine if the finger is in the top half or the bottom half. Depending on the results, then the half where the finger has been detected, may be halved again etc., until the precise position of the finger is found. After each stage, the number of grounded controllable elements can be halved, or reduced, until the location of the user input is determined. If a finger falls on the boundary between two blocks, then the software can select the two neighbouring controlling elements at this boundary to enable the exact position of the finger to be determined.

A similar technique may also be used with the x sensing elements. To detect one finger touching the screen, several x elements may be sensed in a commonly connected block of x elements. One side of the screen may be sensed and then the other side. If a finger is detected in one half, then that half may be sensed in smaller and smaller groups of elements until the exact position of the finger can be found.

FIG. 5(3) shows a masking method where the mask only ever covers one third of the screen. As will be appreciated from the description that follows, in some examples this can greatly reduce the coupling to ground that is required to desensitize elements when compared with other masking methods such as that illustrated by FIG. 5(1) or 5(2).

Successive approximation masking also reduces the time needed to find the position of a finger, as opposed to a sequential scan. For a 32 step mask (that is, 32 independently controllable elements), only 5 or 6 iterations are needed with successive approximation masking to determine the location of the finger. This is opposed to thirty two iterations that would be required by sequential masking.

Successive approximation masking would require a "no-touch" reference table to be generated, representing x sensor values that would be found, under each of the successive approximation mask conditions, when no fingers are touching the screen.

FIG. 5(3) shows an example with three mask positions. This would require a "no-touch" reference for all x inputs for 1) no mask, 2) top mask, 3) middle mask, and 4) bottom mask. This may be required to accurately identify a change from the reference when a touch is applied.

Figure 6:
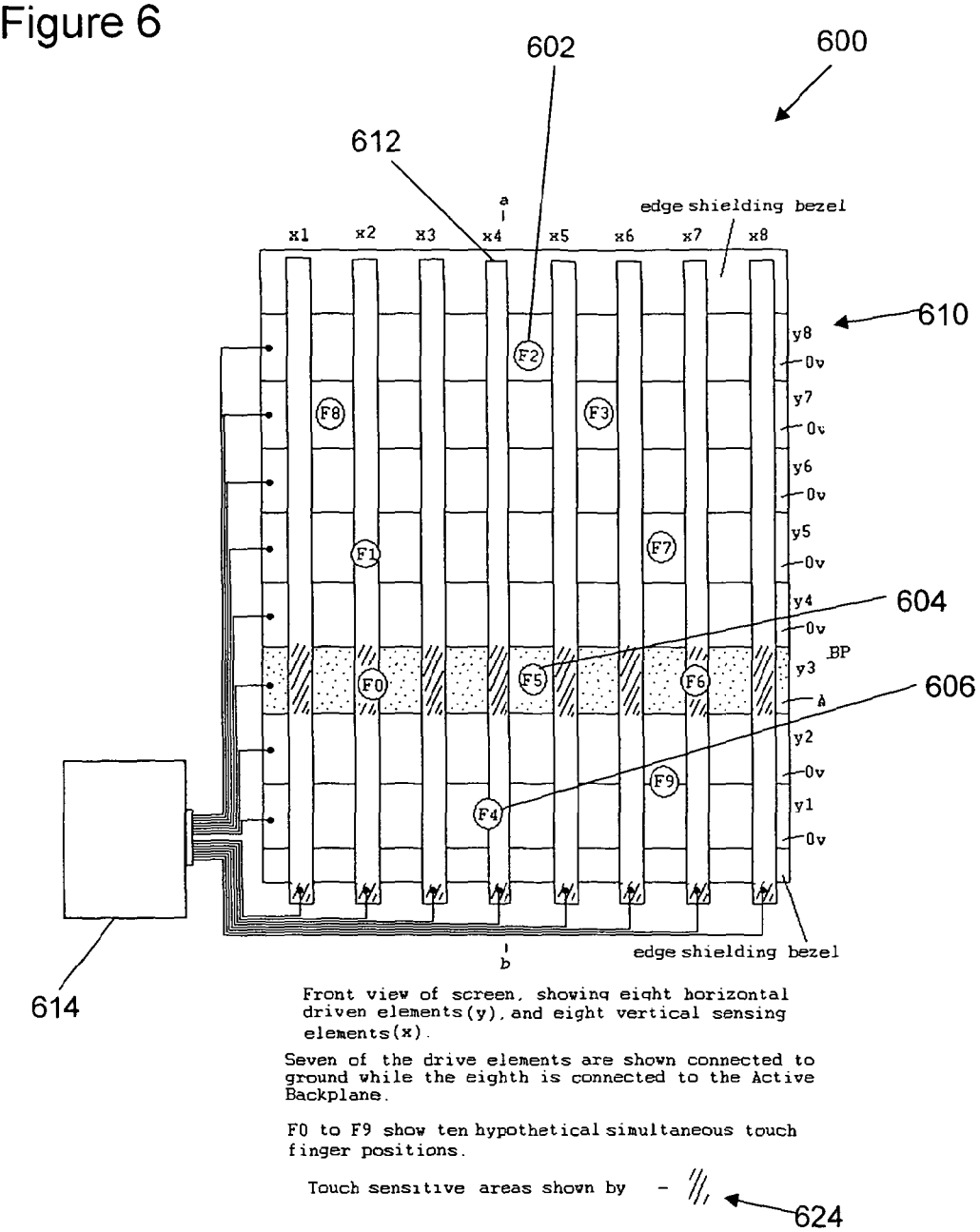
FIG. 6 shows a top view of a mask-able touch screen according to an embodiment of the invention.
Figure 7:
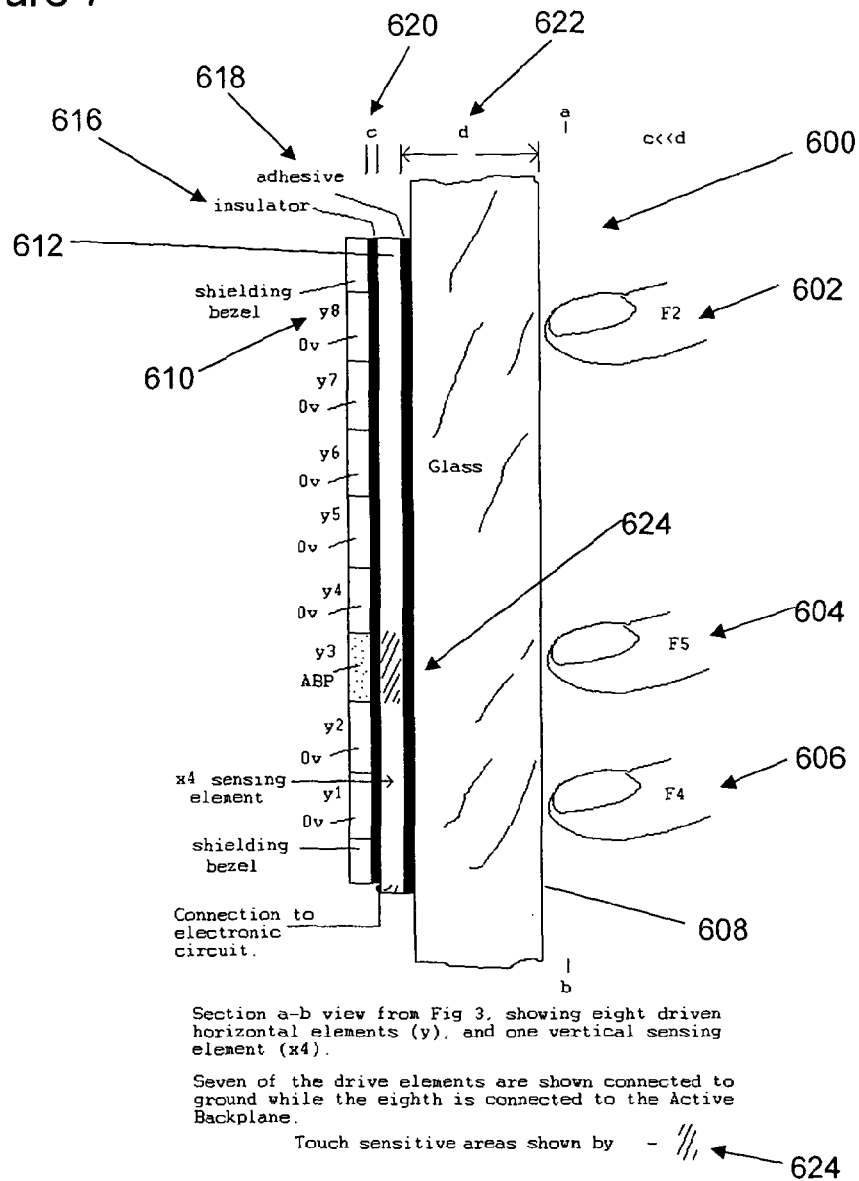
FIG. 7 shows a cross-sectional view through the touch screen of FIG. 6.
Figure 15A:
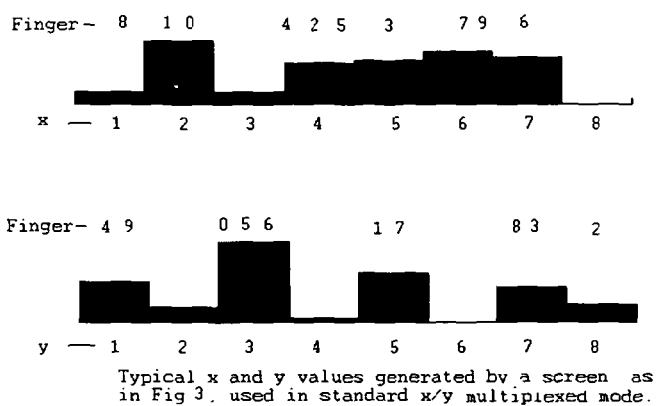
FIGS. 15a and 15b illustrate data returned from the touch sensor of FIG. 6.
Figure 15B:
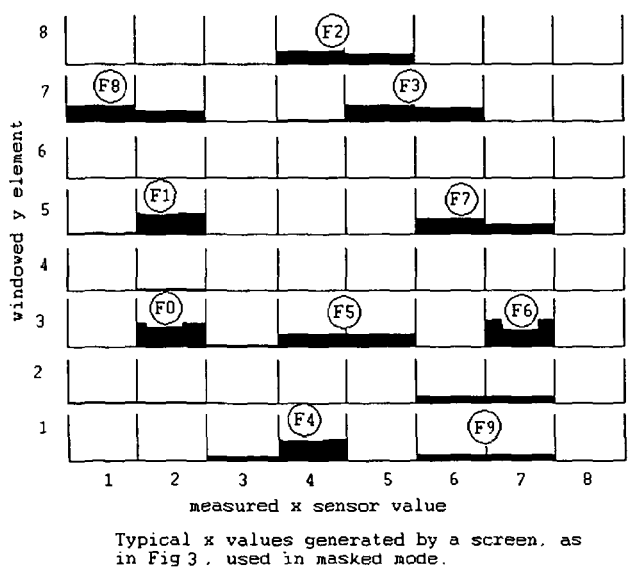

FIG. 6 shows a top view of a mask-able keypad/touch screen 600 suitable for multiple finger detection according to an embodiment of the invention. FIG. 7 shows a cross-sectional view through the touch screen 600 of FIG. 6 along the line a-b. FIG. 15a shows the results of a simple x/y scan of this keypad/touch screen, and FIG. 15b shows the results of a broad mask scan of the same keypad/touch screen.

The touch screen of FIG. 6 includes an eight sensor input by eight controllable element array. The controllable elements can be used to provide a mask, examples of which are described above. The controllable elements can also be used as sensor inputs.

The side of the screen furthest away from the user (as best seen in FIG. 7) is a conductive layer composed of eight horizontal zones (y1-y8), isolated from each other. These zones, or controllable elements, form the mask. Controllable element y8 is shown with reference 610 in FIGS. 6 and 7. Under the control of an electronic circuit 614, which may be referred to as a controller, the controllable elements (y1-y8) will either be connected to ground, or connected to the active backplane signal when acting as a mask, or connected to a sensing circuit, when acting as touch sensor.

In front of the layer of controllable elements (y1-y8), but in very close proximity and isolated from it, are eight vertical conductors (x1-x8) that are connected to an electronic circuit 614 that makes them touch sensitive. These elements (x1-x8) do not occupy the whole of the area of the screen but just a part of it, and may be referred to as sensing elements. Sensing element x4 is shown with reference 612 in FIGS. 6 and 7.

In front of the layer of sensing elements (x1-x8) is a sheet of insulating material such as glass or plastic 608 to shield a user's finger from the sensing elements (x1-x8).

If all of the background elements (y1-y8) are connected to ground, then the very large coupling to ground would make the eight touch sensing elements (x1-x8) in front, very insensitive and incapable of detecting the touch, or close proximity, of a finger.

If, however, one of the y elements is not connected to ground, but is connected to the active backplane signal, then the parts of the x elements that are immediately in front of that enabled y element will be able to detect the touch, or close proximity, of a finger. All eight x elements can be capable of detecting a finger, so, with just one y element ungrounded (and therefore enabled), it is possible to detect up to eight fingers across the width of the y element. The electronic circuit 614 grounds each y element in turn, until all eight y elements have been individually grounded, enabling up to 64 fingers to be detected. After each complete scan of all of the y elements, then the electronic circuit 614 can start a new scan, and continue scanning indefinitely.

FIG. 6 shows the possible position of ten fingers (F0 to F9) on the screen. Finger F2 is shown with reference 602, finger F5 with reference 604 and finger F4 with reference 606. Assuming that a scan starts with y1 being connected to the active backplane and y2 to y7 being grounded, then sensors x1 to x8 will detect a finger, F4 606, at x4 and part of a finger, F9, between x6 and x7.

If y1 is then connected to ground and y2 is connected to the active backplane (ABP), and all the x inputs scanned to sense for a finger, then another bit of finger F9 will be detected between x6 and x7. The results of these two scans show that finger F9 is between x6 and x7 and between y1 and y2.

When y2 is grounded and y3 is connected to ABP, finger F0 will be detected by x2, finger F5 604 will be detected between x4 and x5, and, finger F6 will be detected by sensor element x7.

If y3 is grounded and y4 is connected to ABP, no fingers will be detected by any of the eight x sensing elements, showing that there are no fingers touching this row.

When y4 is grounded and y5 is connected to ABP, then finger F1 will be detected by x2 and finger F7 will be detected between x6 and x7.

No fingers will be detected when y6 is the only y element connected to ABP.

Finger F8 will be detected between x1 and x2, and finger F3 will be detected between x5 and x6 when y7 is connected to the active backplane.

Finger F2 602 will be detected, between x4 and x5, when element y8 is connected to the ABP.

Thus ten fingers or more can be detected and accurately pin-pointed with just eight sensing elements and eight grounding/controllable elements (see FIG. 15*b*). When the fingers move, they can be tracked by continuously scanning the eight x and eight y elements.

A comparison of FIG. 15*a* with FIG. 15*b* shows the significant amount of extra information that can be gained by using the broad mask shown in FIG. 3. FIG. 15*a*, which shows simple x/y scanning, does provide an indication that there are many fingers on the screen but cannot determine exactly which fingers are which, or exactly where they are. In contrast, the masking of FIG. 15*b* does show which fingers are which, and shows exactly where the fingers are.

If the x elements do not occupy the full width of the screen but leave parts of the y elements capacitively "visible" from the front of the screen, then the y elements may also double up as sensing inputs. This enables the screen to act as both a simple multiplexed x/y keypad/touch screen, as in FIG. 1*a*, and a maskable multi-touch screen.

The screen can, in some embodiments, be scanned most of the time as a simple x/y scanner such as the multiplexed array shown in FIG. 1*a*, and the masking method could be used simply to disambiguate the results of the x/y scan as, and when, required. If used like this, the masking can be implemented more intelligently and provide faster detection than if the touch screen were used simply in the mask mode. For example, as no fingers were detected when y4 and y6 were connected to the ABP in the example above, as shown by the y scan results in FIG. 17*a*, then these two elements could be omitted from any mask scan that is purely being used to remove ambiguity derived from a simple x/y scan. Also, any data that is already available about finger positions from an x/y scan can be used to minimise/reduce the amount of information that is needed from the mask scan. The only information that may be required from the mask scan is to disambiguate the data of the x/y scan. The mask scan can be performed faster if it is not required to provide accurate positional information.

In some applications, the percentage of time that a touch screen is being touched can be very small. In such applications, it can be possible to connect all of the y elements to the active backplane signal and simply scan the x sensing inputs only, most of the time. When a finger is detected, then the touch screen can change into x/y scanning mode or multiple touch mask mode. This change may occur automatically under control of the electronic circuit 314, or any other controller.

Exposed ends of the sensing elements, or all the edges of the keypad/touch screen, may be shielded from sensing fingers by a permanently grounded conductive layer, or, if shielded from touch by the user, it can be connected to the active backplane signal.

FIG. 7 shows that, in this embodiment, the y elements are attached to the x elements by a thin adhesive, insulating layer 616. The front of the x elements are attached to the thick sheet of glass 608 by another thin adhesive layer 618 in this example, although in other examples static, or any other means can be used.

For the grounding mask to work effectively, the capacitive coupling between the grounding mask plate (y1-y8) and a touch sensing element (x1-x8) must be much greater than the capacitive coupling between a finger and a touch sensing element (x1-x8). For a parallel plate capacitor, capacitance is directly related to the surface area of the plates and inversely related to the distance the plates are apart:

$$C = aS/D$$

where a is a constant, S is the area of the plates and D is the distance between the plates.

The distance between the grounded mask (y1-y8) and a sensing element (x1-x8) must be much smaller than the distance between a finger (such as finger F2 602 in FIG. 7) and the sensing element (x1-x8). The area of exposure to the grounded mask (y1-y8) can also be large when compared to the area of exposure to the finger in order to provide effective masking.

In FIG. 7, the distance between the y elements and the sensing x elements (c) 620, is very small compared to the distance between the fingers and the sensing x elements (d) 622. The insulating layer 616 between the y and x elements may be about 0.1 mm thick, whereas the thickness of the glass 608 may be 2 mm to 10 mm or more.

Figure 8:
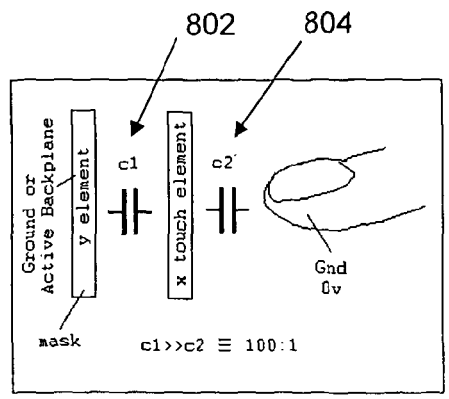
FIG. 8 illustrates capacitive coupling according to an embodiment of the invention.

A schematic pseudo-circuit diagram is shown as FIG. 8, and illustrates the capacitance c1 802 between the controllable y elements and the sensing x elements, and also the capacitance c2 804 between the sensing x elements and a finger. The value of D for capacitor c1 802 in FIG. 8 is about 20 to 100 times smaller than the value of D for capacitor c2 804, based on the distances between the "plates" of the capacitors. The y element also exposes a larger plate area to the x element than the finger, thus increasing further the difference in magnitude between capacitor c1 802 and c2 804. If the y element exposes four times as much surface area to the sensing x element than does the finger, then c1 will be about 80 to 400 times larger than c2. Therefore, when a y element is grounded, it will create a very significant effect on the ability of an overlapping x element (through c1 802) to sense the relatively very small grounding effect of the finger through c2 804. When the y element is connected to the active backplane, however, the capacitor c1 802 effectively disappears, so that the grounding effect of the finger, which may be very small, does have a significant effect on the sensing x element.

It is an intrinsic property of an active backplane signal that it will eliminate the capacitance between the sensed x element and any conductor connected to the active backplane.

The active backplane signal can be derived from the sensing element x by use of a high speed, unity gain, non-inverting buffer (see FIG. 9, which is described in more detail below). The active backplane signal is, as near as possible, exactly the same waveform and phase as the sensing signal, so that any conductor with the active backplane signal on it, will have no, or very little capacitive coupling, with any conductor, with the original sensing signal on it, no matter how close or far apart they are.

In the diagrams of FIGS. 6 and 7, the only y element that is shown connected to the ABP is y3. The areas of the touch sensor 600 that are sensitive to touch are shown with diagonal shading 624.

In FIG. 7, fingers F2 602 and F4 606 are touching the glass 608 in positions that are being blocked from being sensed by the y elements that are grounded behind the sensor x4. These grounded y elements are held to ground, or 0 volts. Finger F5 604, however, is touching the glass 608 in a position where sensor element x4 is sensitive to touch because it is in front of the y element attached to the active backplane. Finger F5 can therefore be sensed by the x4 sensing element.

As the y element scanning circuit 614 scans through all of the eight y elements, different areas of the screen become sensitive to the presence of a finger on the other side of the glass 608. When y8 is connected to the active backplane, then finger F2 602 will be sensed, and when y1 is connected to the active backplane then finger F4 606 will be sensed.

Figure 9:
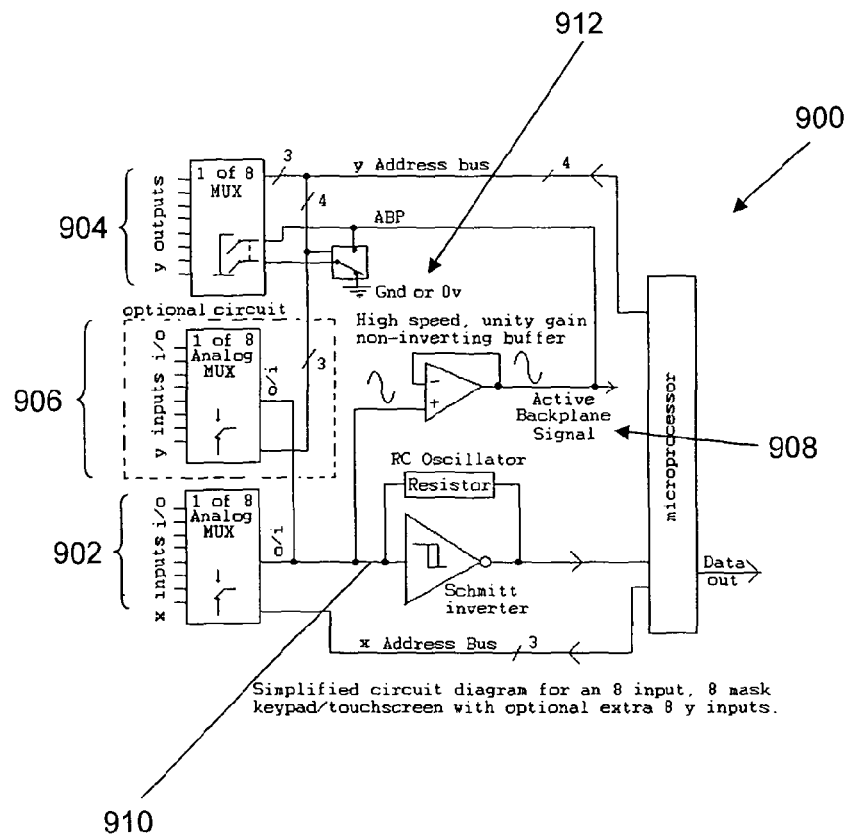
FIG. 9 illustrates a circuit diagram according to an embodiment of the invention.

FIG. 9 shows a simplified circuit diagram of a simple touch detector 900 and active backplane generating circuit according to an embodiment of the invention. The touch detector has eight x sensing inputs 902, eight y controllable outputs 904 for controllable elements, and optionally eight y sensing inputs 906. As discussed below, the eight y sensing inputs 906 may, or may not, be the same as the eight y controllable outputs 904.

The example shown in FIG. 9 develops an active backplane signal 908 from a sensing input signal 910 derived from the x sensing inputs 902 (and optionally the y sensing inputs 906) in a touch sensitive Resistor/Capacitor (RC) oscillator. In this type of circuit, a change in capacitance causes a change in frequency of the sensing input signal 910. Other sensing methods can also be used, many of which do not result in a change in frequency with a change of capacitance. Other touch sensing methods may affect the amplitude of a waveform, without changing the frequency, and the active backplane signal for this would be the original waveform itself.

If more than one x element 902 is to be sensed at exactly the same time, then it will be advantageous to use a sensing method that does not involve a change in frequency. If different sensing elements are running at different frequencies, all at the same time, then it is impossible to create a common active backplane signal. If, however all sensing inputs are running at the same frequency, then they can all be driven from a common signal, which would also be used as the common active backplane signal. This can, for example, involve a fixed frequency that changes in amplitude, phase or causes a change in charging current, in response to a change in capacitance. A small amount of jitter, in the frequency, may be introduced to reduce electromagnetic emissions.

FIG. 9 also shows that the y driven elements 904, which would normally be connected to ground 912 or the active backplane signal 908, may be replaced, occasionally, or regularly, by an alternative bank of sensing elements. 906. This can allow the screen to switch from a standard x/y multiplexed sensing screen to a masked, multi-touch screen. In other embodiments, the y elements that are driven may themselves double up as sensing elements, in which case, this extra bank of sensing elements would not be necessary as a single set of eight y elements could be used as both sensing and controllable elements. If extra y sensing elements are used, then, while they are actively being used for sensing, the driven y elements should all be connected to the active backplane signal so that they do not interfere with the sensitivity of the y sensing elements.

FIG. 10 shows a maskable keypad/touch screen 1000 with eight driven y elements 1002, eight wire sensing y elements 1004 and eight wire sensing x elements 1006. Each of the elements 1002, 1004, 1006 is coupled to a connector 1008 that can be connected to a circuit such as the one shown in FIG. 9.

In this example, the wire sensing elements 1004, 1006 are made of fine insulation coated wire. The eight horizontal driven y elements 1002 are made of a plate type material, such as ITO or ATO, copper foil, conductive printed ink, or perforated conductor or mesh, and are located behind, and insulated, from the wires 1004, 1006.

The touch screen 1000 can be used in a standard x/y multiplexed mode, in which mode the horizontal plates 1002 are all connected to an Active Backplane signal, so that they do not interfere with the functioning of the sensing wires 1004, 1006. When used in multi-touch mask mode, seven of the eight horizontal plate elements 1002 are connected to ground, and the remaining horizontal plate elements 1002 is connected to the Active Backplane signal, or may be left floating.

Figure 11:
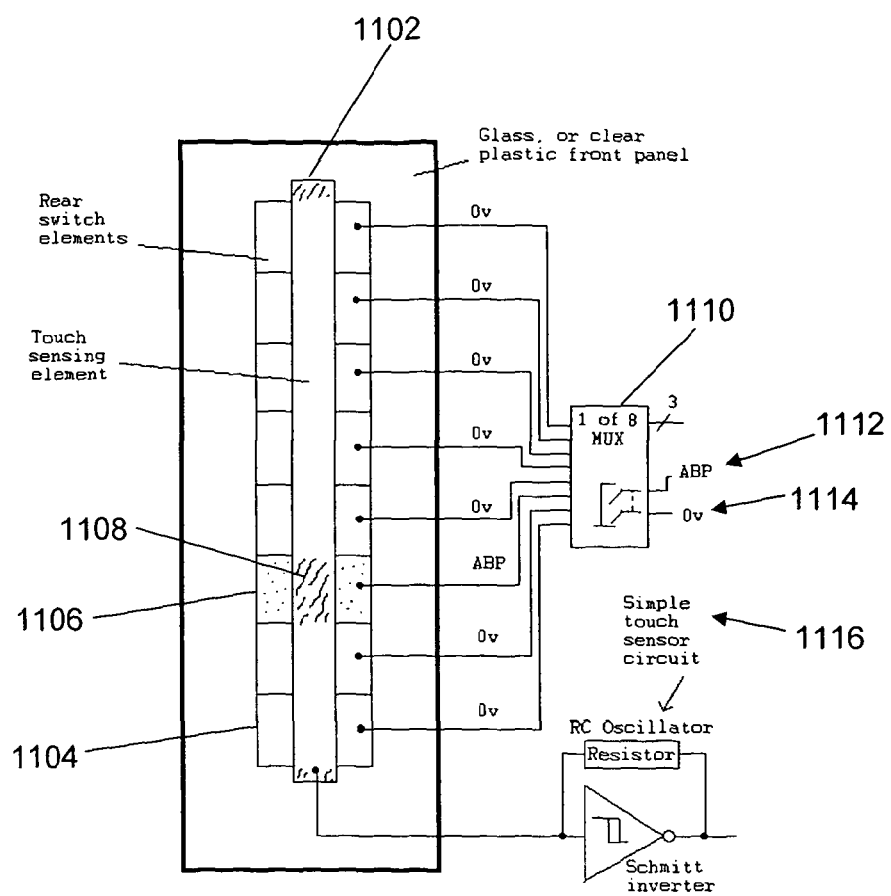
FIG. 11 shows a single touch sensing element and an eight element electronically switchable mask consisting of eight controllable elements according to an embodiment of the invention.

FIG. 11 shows a single touch sensing element 1102 and an eight element electronically switchable mask consisting of eight controllable elements 1104. A touch sensor circuit 1116 is coupled to the sensing element 1102.

FIG. 11 shows how it is possible to make a single touch sensitive element 1102 function as a series of touch sensitive elements by masking most of the touch sensitive element 1102 from touch. Parts of the touch sensitive element 1102 are masked by strong capacitive grounding, and are, therefore, not sensitive to touch. Connecting one controllable element 1106 to the active backplane, or left floating, leaves a small window in the mask 1108, through which touch can be sensed.

The grounding of one or more of the controllable elements 1104 in FIG. 11 is through an electronic switch such as a multiplexer 1110 that connects each of the controllable elements 1104 to either zero volts 1114 or an ABP signal 1112. In the example of FIG. 11, the third controllable element 1106 from the bottom is connected to ABP 1112 by the multiplexer 1110 such that this controllable element 1106 is connected to the active backplane. All other controllable elements are connected to zero volts 1114 by the multiplexer in order to desensitize the remainder of the sensing element 1102. In this way, the region of the sensing element 1102 that crosses over the ungrounded controllable element 1106 is sensitive to touch. This is shown in FIG. 11 as reference 1108. All regions that cross over grounded controllable elements are not touch sensitive.

Figure 12:
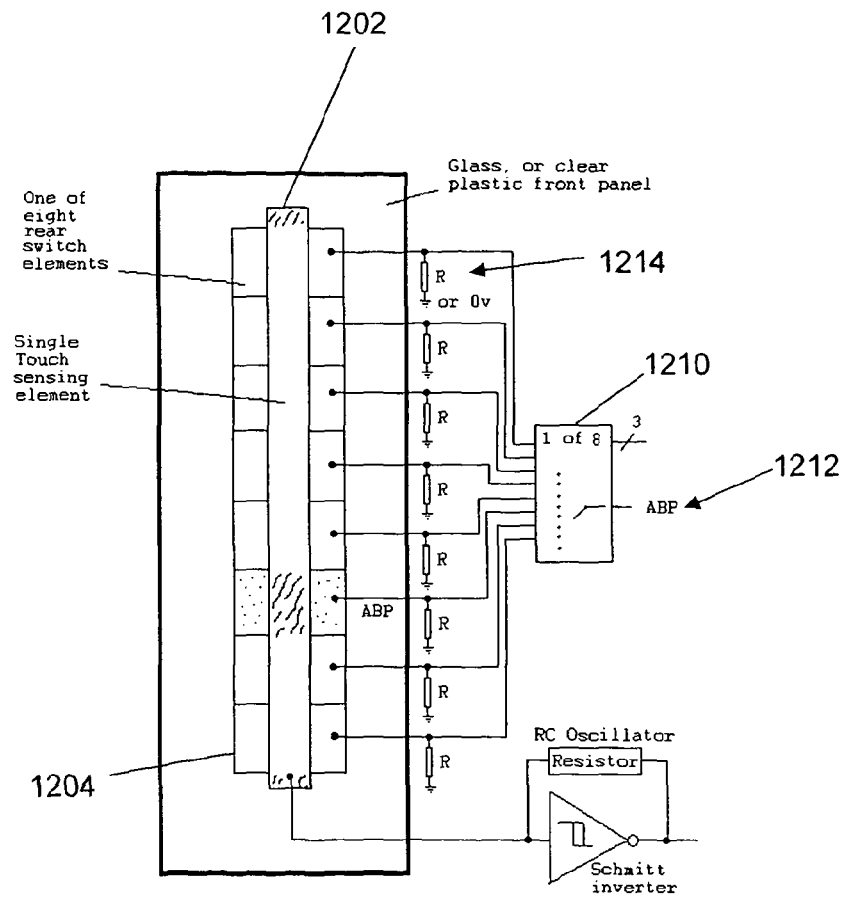
FIG. 12 shows a single touch sensing element and an eight element electronically switchable mask consisting of eight controllable elements according to another embodiment of the invention.
Figure 13:
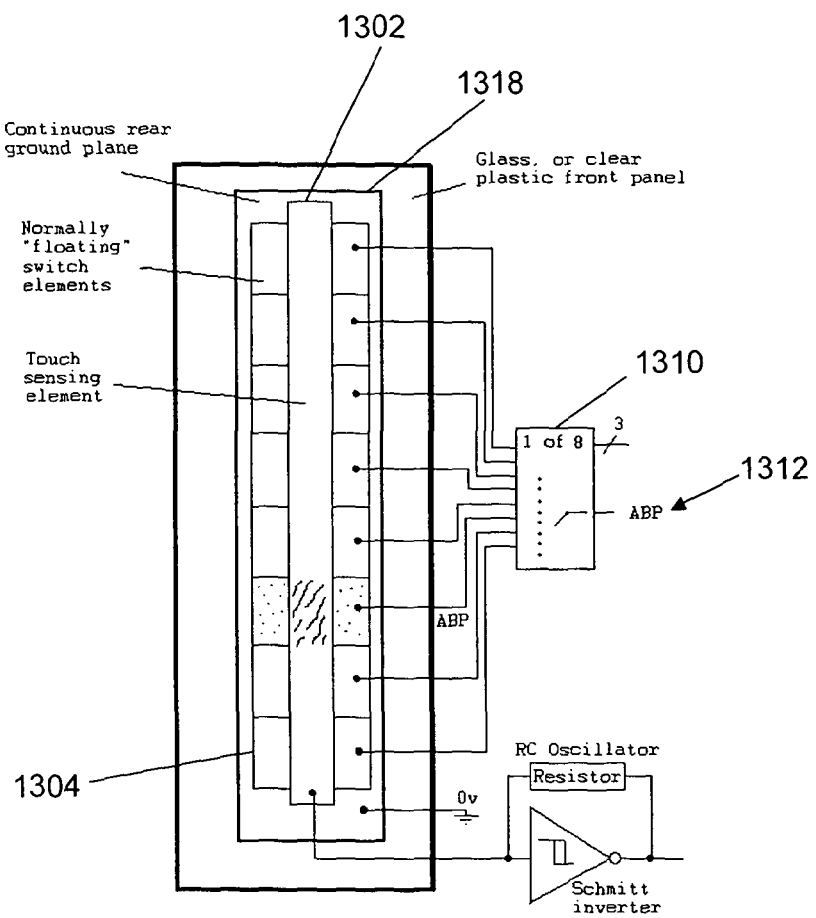
FIG. 13 shows a single touch sensing element and an eight element electronically switchable mask consisting of eight controllable elements according to another embodiment of the invention.

FIGS. 12 and 13 show single touch sensing elements 1202, 1302 that are similar to FIG. 11.

The controllable elements 1204 of FIG. 12 can be connected to an ABP 1212 by a multiplexer 1210. If a controllable element 1204 is not connected to ABP 1212, then it is pulled down to ground by a pull down resistor 1214. A pull down resistor is connected between each of the controllable elements 1204 and ground or zero volts.

The controllable elements 1304 of FIG. 13 can be connected to an ABP 1312 by a multiplexer 1310. If a controllable element 1304 is not connected to ABP 1212, then it is left "floating" such that it is strongly capacitively coupled to a grounded conductive plate 1318 located behind the switch mask of controllable elements 1304.

Figure 14A:
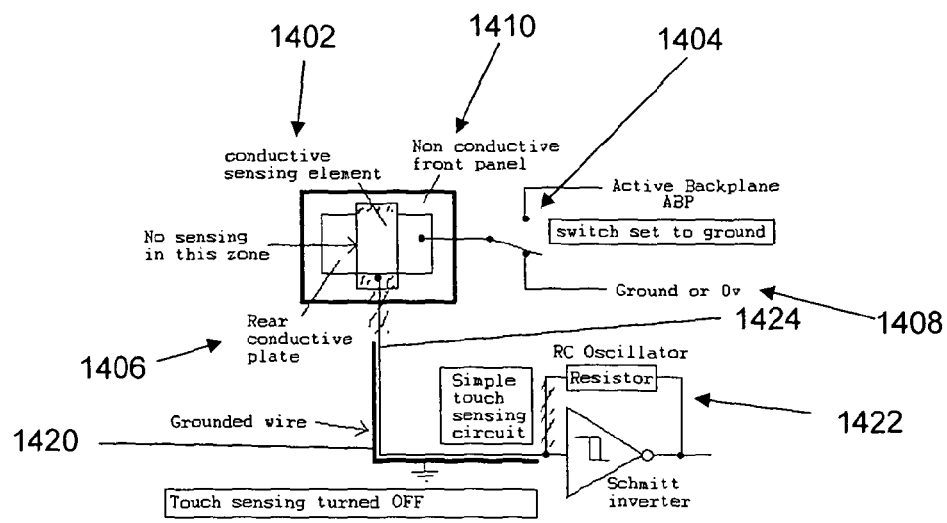
FIGS. 14a and 14b show a single, mechanically or electrically operated, touch masking switch according to an embodiment of the invention.
Figure 14B:
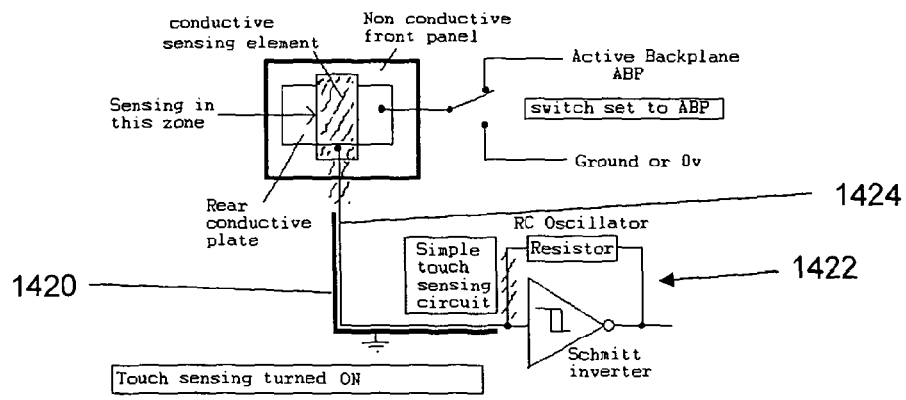

FIGS. 14a and 14b show a single, mechanically or electronically operated, touch masking switch according to an embodiment of the invention. FIG. 14*a* shows the touch masking switch with touch sensing turned off, and FIG. 14*b* shows the touch masking switch with touch sensing turned on.

FIG. 14 shows how touch sensing from a conductive plate, the sensing plate/element 1402, can be turned on and off by operation of a simple mechanical switch 1404. A first terminal of the switch 1404 is connected to another conductive plate, the controllable plate/element 1406. The controllable plate 1406 is behind the sensing plate 1402, and is in very close proximity to, but isolated from, the sensing plate 1402. The first terminal of the switch 1404 can be connected to either an ABP signal 1404 or ground 1408 depending on the state of the switch 1404

When the controllable plate 1406 at the rear is connected to ground 1408 by the switch 1404, then there is very strong coupling of the sensing element 1402 to ground. This grounding effect dramatically reduces the sensing plate's 1402 ability to sense the very small extra grounding effect of a nearby finger through the non-conductive front panel 1410. When the rear controllable plate 1406 is connected to the Active Backplane signal 1404, however, the capacitive coupling of the sensing plate 1402 to ground is removed, and the sensing plate 1402 can now sense the very small grounding effect of a nearby finger.

In other embodiments, an electronic switch can be used instead of the mechanical switch 1404, and this can enable the touch sensing switch, described above, to be turned on and off electronically (see FIGS. 11, 12, and 13). An electronic switch can operate more quickly than a mechanical switch, which in turn can lead to a more responsive touch sensor with a reduced likelihood of user input being missed.

FIG. 14 also shows an optional grounded wire 1420 that is provided close to the wire/cable 1424 that connects the sensing element 1402 to the sensing circuit 1422. In this way, the operational ground wire 1420 can reduce the chances that any user (or otherwise) interaction with the wire/cable 1424 is inadvertently identified as input at the sensing elements. A grounded wire, running very closely alongside a sensing wire, will desensitized that length of sensing wire to touch, where both wires are in close proximity.

FIGS. 15*a* and 15*b* illustrate data returned from a touch sensor that receives user input from the ten fingers F0 to F9 shown in FIG. 6. FIG. 15*a* shows data returned from the touch sensor when used in multiplexed x/y touch sensor mode. FIG. 15*b* shows data returned from the same touch sensor but used in broad mask mode.

The x and y values in FIG. 15*a* show that all 10 fingers have been detected but that their values have been overlaid on each other, making it difficult, or impossible to determine how many fingers there are, or where exactly they are.

In contrast, FIG. 15*b* shows the measured x sensor data for each of the controllable y elements separately, as each of the y elements have been windowed (ungrounded) in turn. The eight masked scan results shown in FIG. 15*b* can be used to determine that there are ten fingers, and the positions of the fingers can easily be calculated using a simple algorithm, such as centroids.

Figure 16:
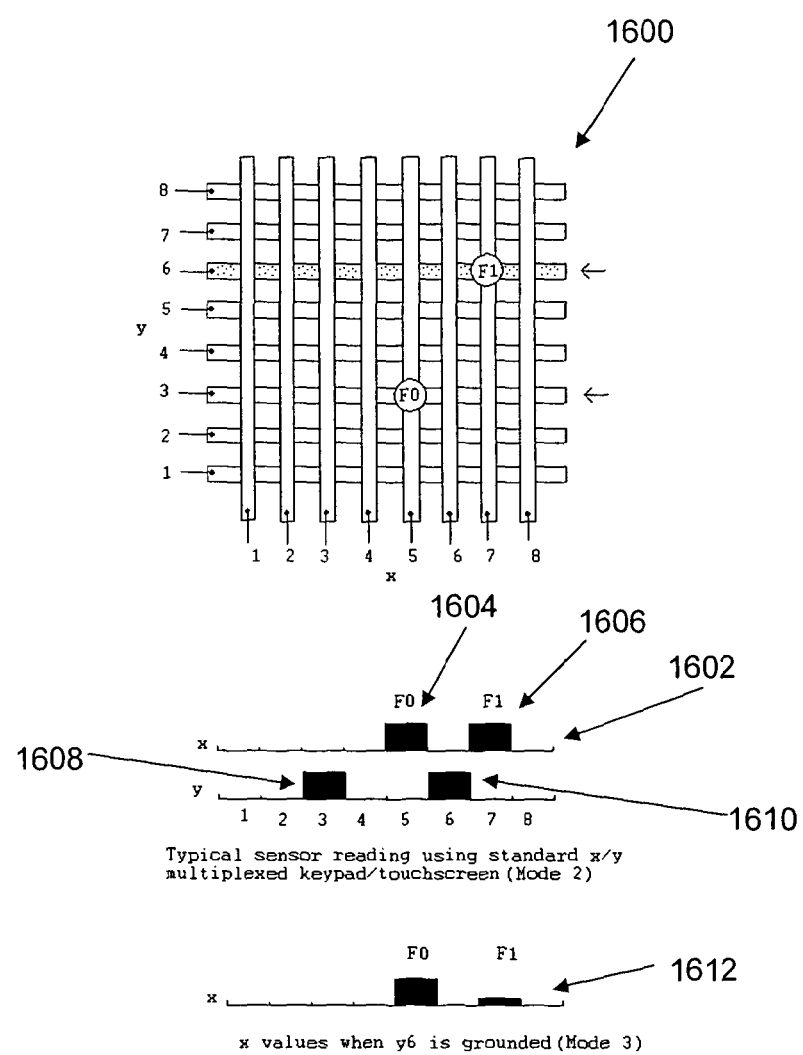
FIG. 16 shows how a narrow mask may be used to disambiguate two fingers according to an embodiment of the invention.

FIG. 16 shows how a narrow mask may be used to disambiguate two fingers according to an embodiment of the invention. FIG. 16 shows the simple multiplexed array 1600 of FIG. 1*a*, and the resulting x and y scans 1602. As previously discussed it is not possible to determine which of the two x peaks 1604, 1606 is associated with which of the two y peaks 1608, 1610, using the standard x/y sensing mode. However, by grounding one of the y elements associated with one of the y peaks, it is possible to see which x peak is associated with which y peak. For the example of FIG. 16, it is found that x7 diminishes significantly when y6 is grounded. This is shown graphically with reference 1612 and can enable a determination to be made that there is a finger at x7/y6. By default, and process of elimination, therefore, the other finger is at coordinate x5/y3. This method of masking has, therefore, enabled the results of the simple x/y multiplexed scan 1602 to be disambiguated when two fingers are touching the screen 1600.

Figure 17:
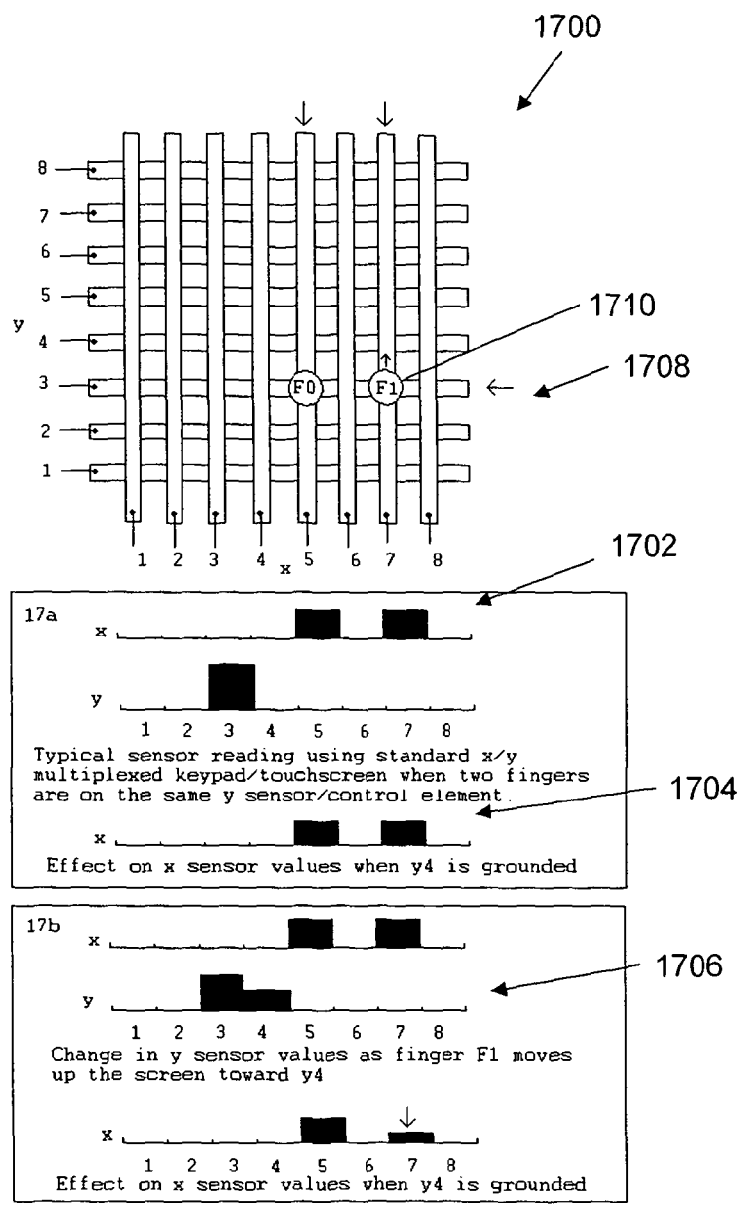
FIG. 17 shows how a narrow mask may be used to disambiguate two fingers according to an embodiment of the invention.

FIG. 17 shows how a targeted narrow mask may be used according to an embodiment of the invention to determine rapidly and accurately, how two fingers are moving when they both start on the same masking element 1708, even though a low power controller may be used. (see section—Modes of operation with a low powered processor). When two fingers have been detected to be on the same horizontal sensor element y3 1708 as in FIG. 17. It is impossible to distinguish one finger from the other using standard x/y edge detection. Although FIG. 17*b* shows that one of the fingers has moved upwards towards y4, as indicated by the changes in the y sensor values, there is no indication in the x sensor values which finger has moved upwards. If, however, the y4 element is converted into a grounded controlling element, then as the finger moves up the screen the associated x sensor reading for that finger diminishes. Comparing FIGS. 17*a* and 17*b*, shows that it is finger F1 1710 that has moved up the screen.

Instead of repeatedly masking all eight elements sequentially, one at a time from y1 to y8, only elements y2 and y4 could be selectively grounded alternately, and optionally very rapidly, resulting in a very rapid speed of response to any movement.

If one finger 1710 moves up the screen 1700, then it will approach the next y sensor element, which in this example is y4. If y4 is grounded, then, one of the x peaks will diminish in amplitude, the diminution being synchronous with the time when y4 is grounded and y2 is ungrounded. The x peak that diminishes is, therefore, the finger that is moving up the screen. In FIG. 17, x7 is the x peak that diminishes, therefore, finger F1 1710 is moving up the screen. Finger F0 is the only finger left, and so, finger F0 is the one that does not move up the screen. Had the finger F1 1710 been moving down the screen instead of up, then the same observation would have been made, but this time the diminution would have been synchronous with the time that y2 was grounded and y4 was ungrounded, thus showing that the finger F1 1710 was moving down the screen.

By concentrating masking around the two neighbouring masking elements, instead of using a continuous sequence of masking across the whole screen of eight masking elements, then the response time can be increased by a factor of four (in this example). Had 32 elements been used, then the response time would have been increased by a factor of 16.

Figure 18:
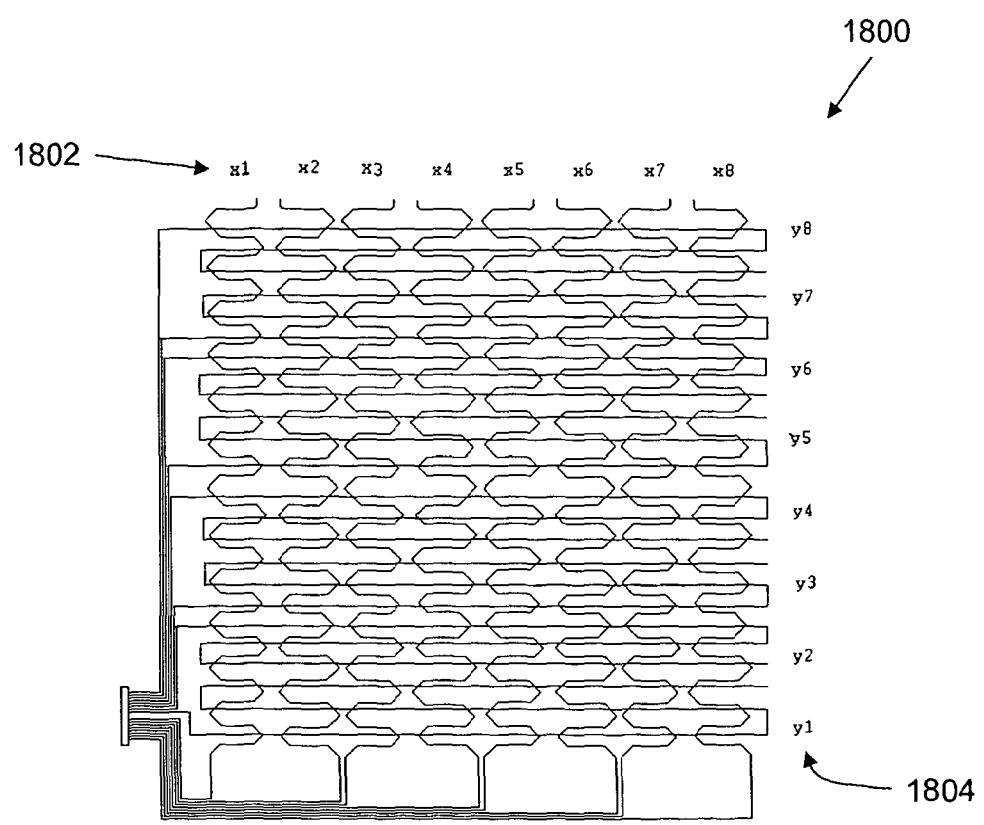
FIG. 18 shows a fine wire screen according to an embodiment of the invention.

FIG. 18 shows a simple fine wire screen 1800 that is wired for some capacitive cross coupling between the x wires 1802 and the y wires 1804. The x wires 1802 and y wires 1804 are examples of elements for a touch sensor.

In FIG. 18 the elements are made from fine wire, although in other examples, solid plate type materials, such as ITO and printed conductive ink can be used for the elements. A disadvantage of using wire can be a reduction in capacitive coupling between the sensing elements and the masking elements. Elements having large flat plated areas that cross each other can result in large amounts of capacitive coupling, due to a large area of overlap between the capacitive plates. In contrast, wire elements have very small cross sectional areas and, therefore, produce very little capacitive coupling. This fact can be advantageous for standard sensing, but may be disadvantageous for some of the masked sensing methods described herein. There is, however, some capacitive coupling with wire, and this can be sufficient to enable masked sensing methods in some embodiments. Grounding a wire, or wires, in the y dimension 1804 can attenuate the sensitivity of the wire or wires in the x dimension 1802. The differences in values sensed in the x dimension 1802, with grounded and ungrounded wires in the y dimension 1804, is large enough to be used to disambiguate the results of an x/y multiplexed scan where more than one finger is placed on the screen at the same time.

Further resolution can be obtained by alternately scanning the screen with x elements as sensing elements while y elements are controlling elements, followed by a scan with y elements as sensing elements while x elements are controlling elements. By combining the results of these two scans together, enough extra information can be obtained to enable wire elements to be used more reliably in full mask mode. The result of the first scan may identify "preliminary" locations of one or more user inputs, and the result of the second scan may determine a "secondary" location of one or more user inputs. A composite/final location of the one or more user inputs can then be determined in accordance with the preliminary location and the secondary location.

When using fine wire as a touch sensing element and/or as a controlling element, the cross coupling may not be as strong as when plate type material is used. In order to improve the ability to use the masking technique with wire, therefore, embodiments of the invention include the functionality to:

1) perform a masking scan with the x wires used as sensing elements while the y wires are used as controlling elements, then
2) perform a masking scan with the y wires used as sensing elements while the x wires are used as controlling elements, then
3) combine the results of the previous two scans together to produce a higher resolution, composite scan result.

This functionality is not limited to wire elements, and may also be used with other element types, as long as the x and y elements are both capable of being sensing and controlling elements.

FIG. 18 shows wires 1802, 1804 that are zig-zagged, that is they can follow a path that doubles back on itself, to increase the amount of capacitive coupling between wires in the x and y axes 1802, 1804. When used in standard x/y multiplexed mode, the capacitive coupling is eliminated by connecting wires that are not being sensed to the Active Backplane. When used in masked mode, however, one or more wires in the y plane 1804 can be grounded, and this can cause significant enough capacitive coupling with one or more wires in the x plane 1802, to have a measurable effect. This can allow results from the standard x/y detection system to be disambiguated sufficiently to determine which finger is which when two fingers, or more, are used on the screen at the same time.

Figure 19:
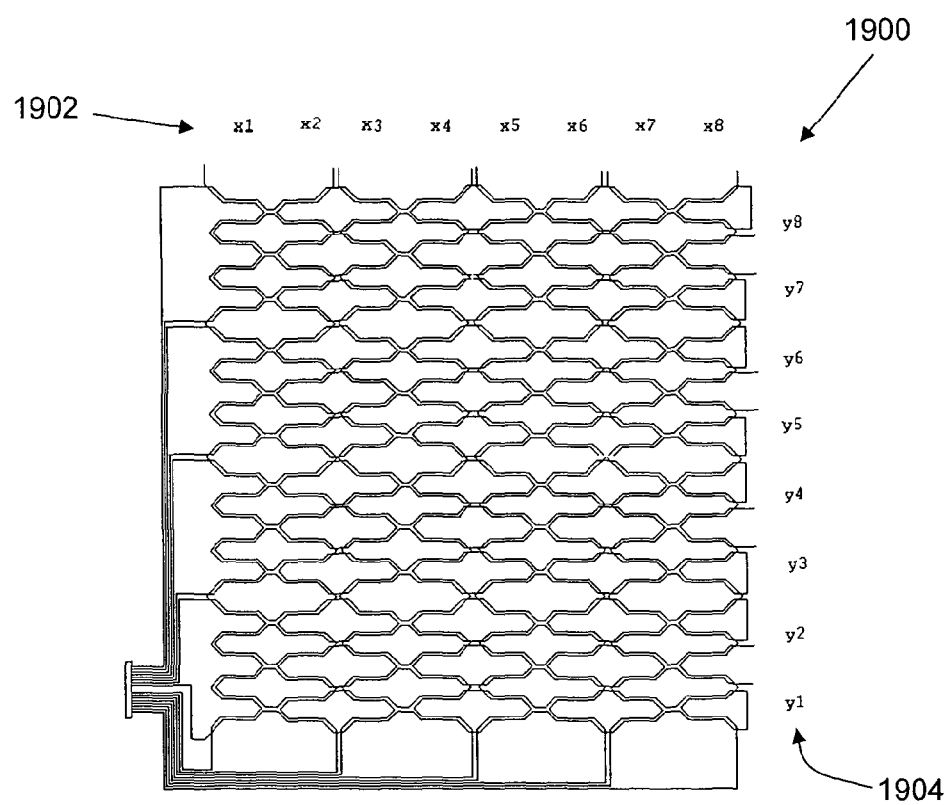
FIG. 19 shows a fine wire screen according to another embodiment of the invention.

FIG. 19 shows a fine wire screen 1900 that is wired to increase the capacitive coupling between wires that extend in the x axis 1902 and wires that extend in the y axis 1904. The layout of the wires 1902, 1904 in FIG. 19 is such that a portion of an x wire 1902 follows a path that is substantially parallel to, and substantially adjacent to, a portion of a y wire 1904 in a region of the screen 1900 that the portions of the x wire 1902 and y wire 1904 correspond with each other to provide a sensing region. Placing regions of an x wire and y wire substantially parallel to, and substantially adjacent to, each other can improve the capacitive coupling between the wires.

Figure 20:
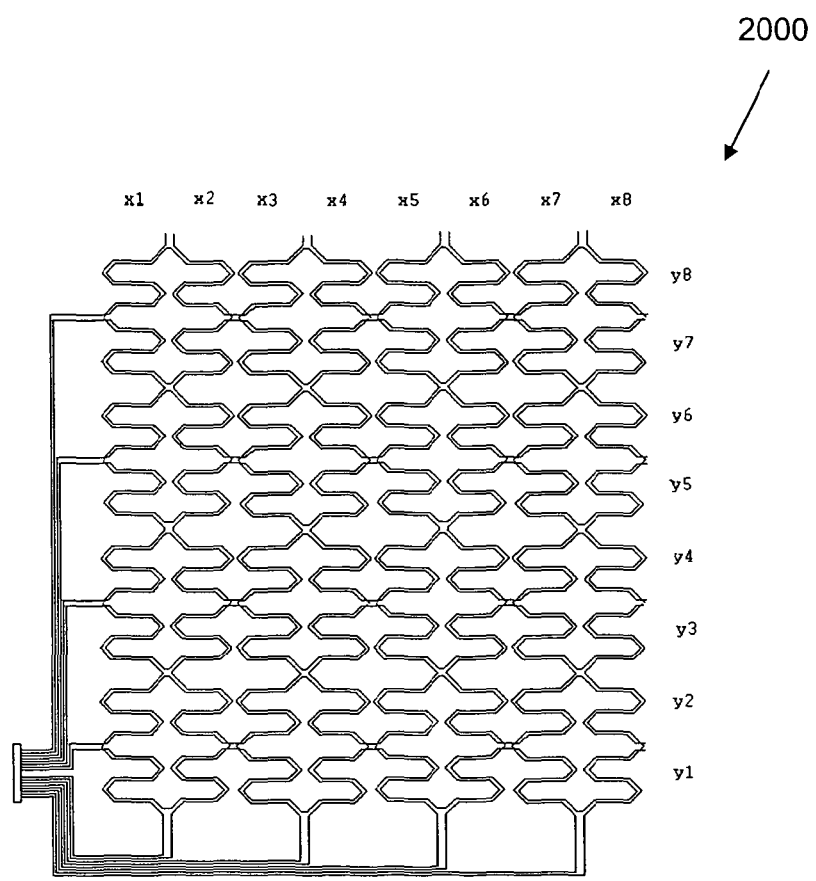
FIG. 20 shows a fine wire screen according to a further embodiment of the invention.

FIG. 20 shows an alternative fine wire screen 2000 that is wired to increase inter-wire capacitive coupling. The screen 2000 allows the screen material to be cut down in size, if required, without loss of functionality.

In FIGS. 18, 19 and 20, all the vertical wires start at the bottom of the screen and zig-zag up the screen. If the screen was cut shorter, then the remaining wires would still be connected to the controller. The horizontal wires, however, zig-zag all the way across the screen in FIGS. 18 and 19. The zig-zagging for any particular sensing zone is stretched across all the sensing zones in that row. If the screen was cut vertically so that only the left hand side of the screen remained, then in the diagram shown, two thirds of the wire going to every input would be cut off, and isolated from the input. In FIG. 20 the wire is laid out in a manner that prevents this. All the zig-zagging required for each sensing zone is complete within that sensing zone.

Figure 21:
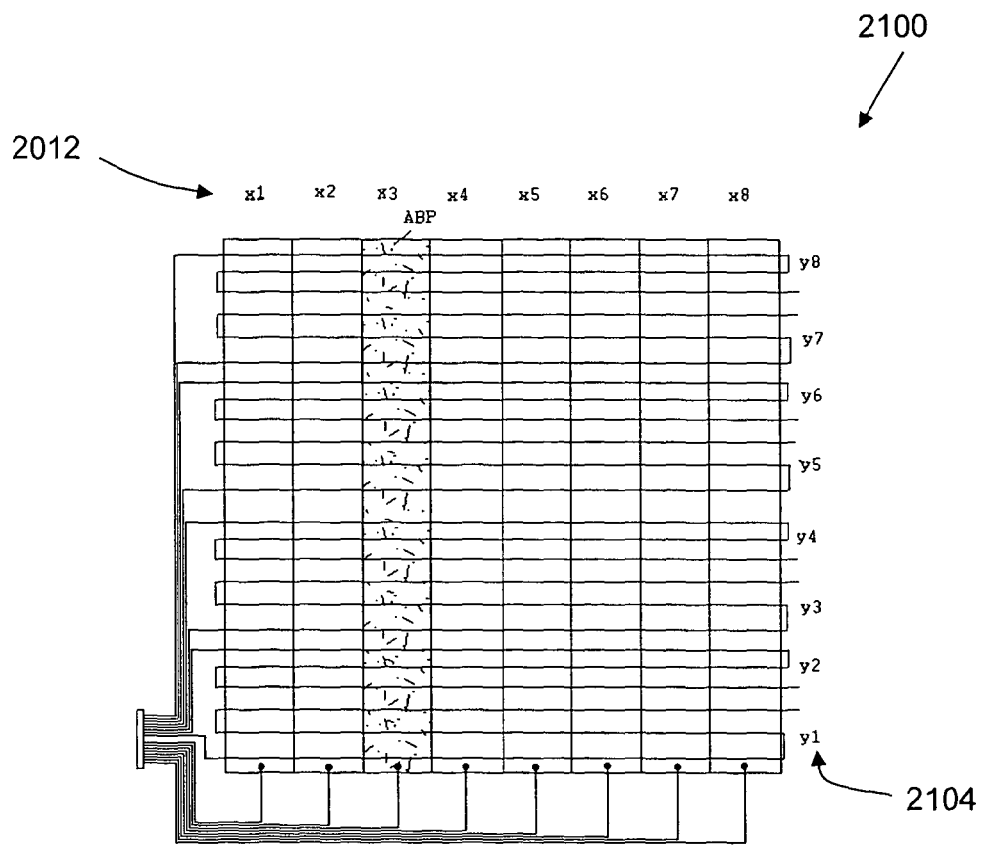
FIG. 21 shows a touch screen according to an embodiment of the invention.

FIG. 21 shows a touch screen 2100 with a masking vertically extending (x) driven layer of elements 2102 that are situated behind a horizontally extending (y) sensing layer of elements 2104 that are made of fine wire. In this example, the masking layer is vertical and the sensing layer is horizontal. The wiring pattern of the sensing elements 2104 in this embodiment is very simple and may be replaced by more complex layouts such as those illustrated in FIGS. 18, 19, and 20.

Figure 22:
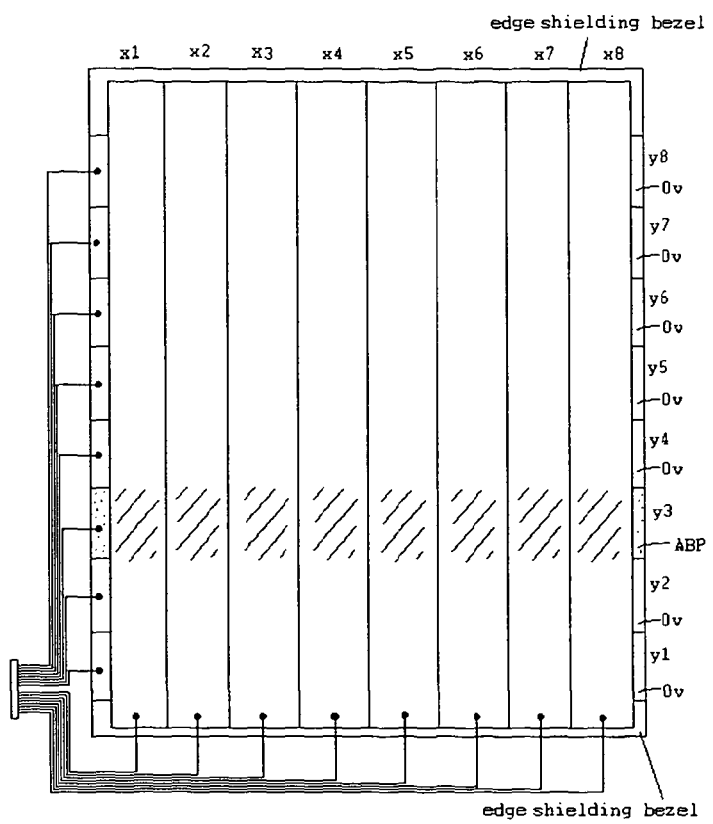
FIG. 22 shows a touch screen according to another embodiment of the invention.

FIG. 22 shows a touch sensor where all the horizontal y elements are as wide as possible, are made of plate-like material, such as Indium Tin Oxide (ITO) and are always used as controlled elements, being connected either to ground or to the active backplane. The vertical x elements, are in front of the y elements, being situated between the user and the y elements. These are also as wide as possible, with no spaces between the x elements to capacitively "see" the rear y elements. The x elements are always used as touch sensors.

The advantage of this arrangement is that the pattern of ITO is very simple, and offers very good optical and functional properties. The ITO occupies nearly all of the screen with very few isolating tracks to obscure vision. The full width of the ITO also reduces the resistance of the x and y tracks to a minimum.

Figure 23:
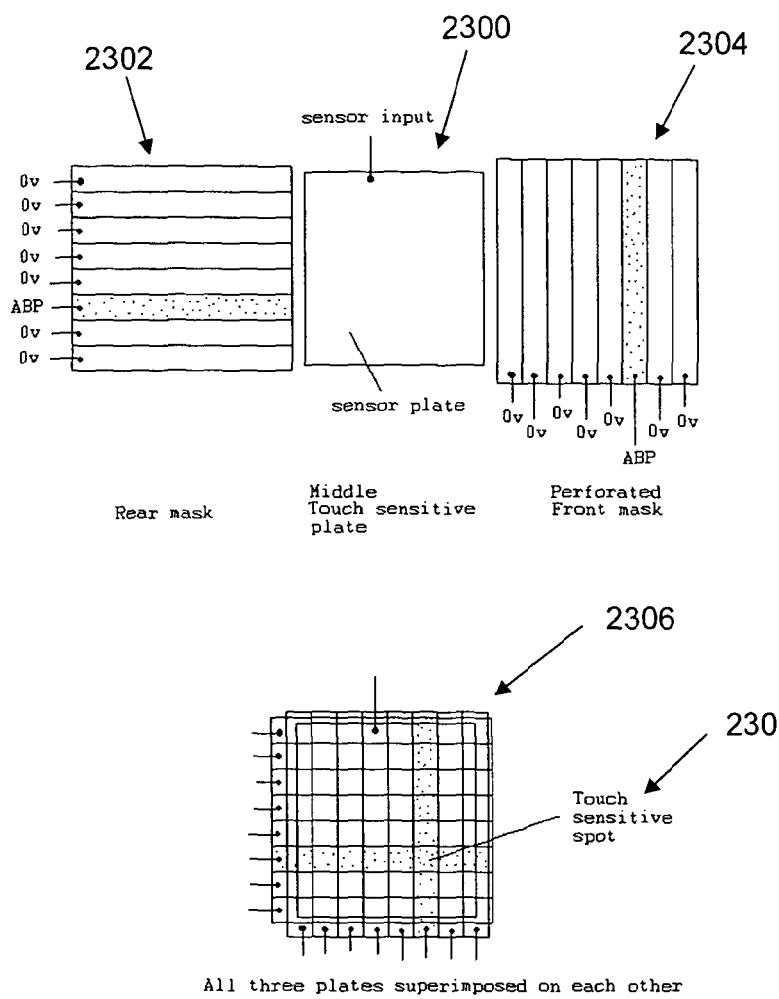
FIG. 23 shows a touch screen according to a further embodiment of the invention.

FIG. 23 shows a single touch sensitive plate 2300 with two layers of masking 2302, 2304. FIG. 23 illustrates an alternative form of extreme masking that uses a layer of driven x elements 2304 and a layer of driven y elements 2302 to mask the majority of the screen. All but one of the driven x elements and all but one of the driven y elements can be grounded, with the remaining x and y element connected to the active backplane. This will desensitize most of the touch sensitive plate 2300, leaving a small spot sensitive, at the intersection of the x and y elements that were connected to the active back plane. Reference 2306 shows how the touch sensitive plate 2200 and the two layers of masking 2302, 2304 can be overlaid on top of each other to provide the touch sensitive window/spot 2308.

The touch window 2308 may be used with different sizes, and at different positions, by changing which of the driven elements 2302, 2304 are grounded or connected to the active backplane. The touch window 2308 may be used to systematically scan a small window across the entire touch sensing surface, or can select specific areas for sensing.

In order that the sensing layer, 2300, can sense the finger through the front mask, 2304, in the position that is connected to the active backplane, the front mask must have gaps in it. A reticulated front mask would be ideal.

The sensing plate 2300 could be at the back, while the two masking plates 2302 and 2304 are at the front. With this arrangement, however, both masking plates would need to have gaps in them in order for the sensing plate to sense a finger through them.

Figure 24:
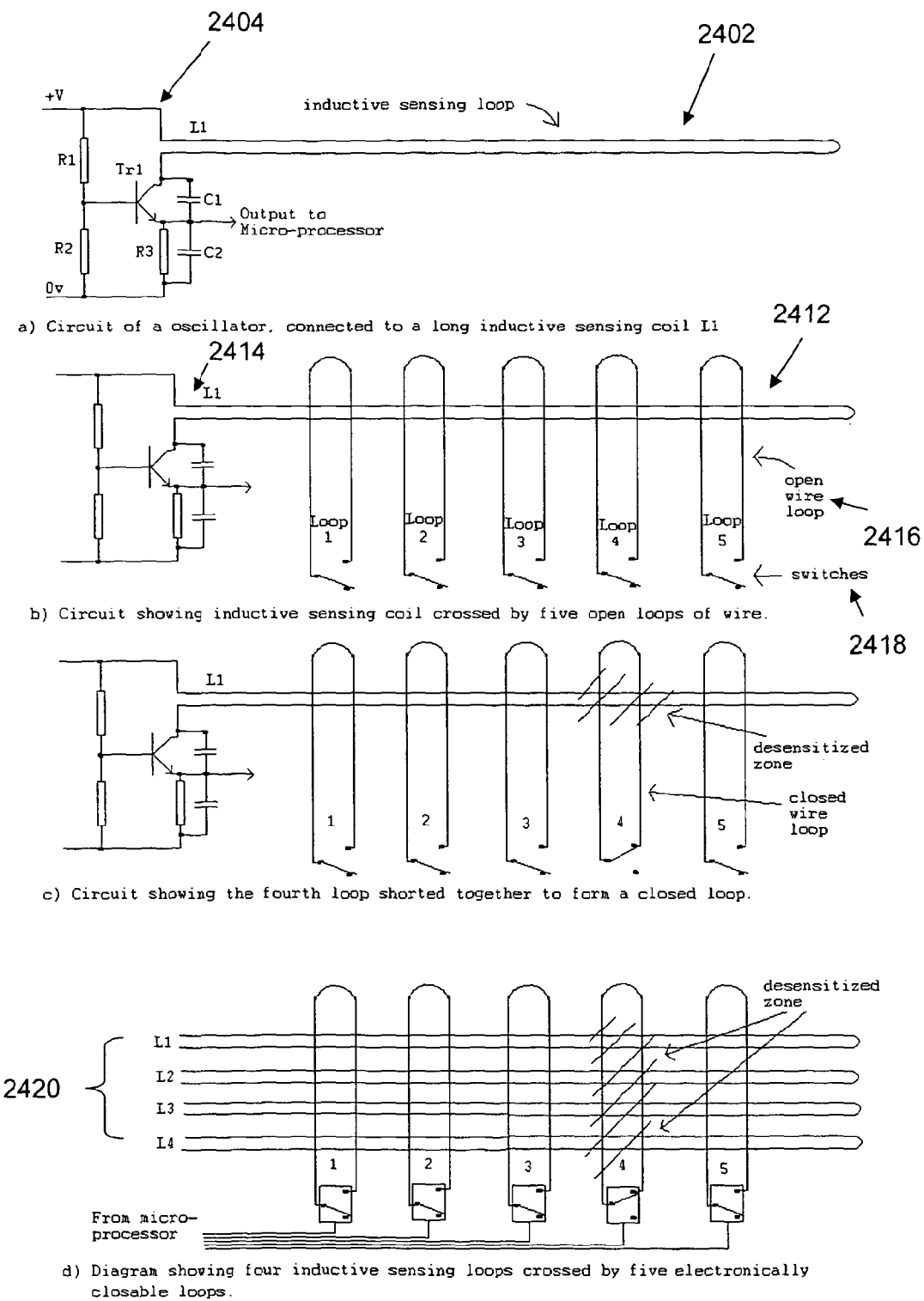
FIG. 24 shows a masked inductive touch sensor according to an embodiment of the invention.

FIG. 24 shows a masked inductive touch sensor according to an embodiment of the invention. Such inductive sensors are known to be used with a metal stylus to touch the screen, for example.

FIG. 24a, shows an inductive wire loop 2402 connected to an oscillator circuit 2404. The frequency of the oscillator depends on the inductance of the wire loop, L1, 2402 and the capacitor C1. When anything metal (such as a stylus) comes near the wire loop L1 2402, its inductance is increased, and the frequency of the oscillator 2404 changes.

Parts of the loop's response to any nearby metal, however, can be reduced by placing another loop of wire close to it, thereby desensitizing the touch sensor. If this second loop is a closed loop, its effectiveness will be greater than if it is an open loop.

FIG. 24b, shows five open loops 2416 crossing the inductive sensing loop L1 2412. These open loops 2416 will all have an effect on the frequency of the sensing oscillator 2414, and will reduce, to some extent, the sensing efficiency of the circuit. However, the ability to detect a nearby metal object would be far worse if any one or more of the loops 2416 were closed, thereby creating a ring of wire. The open loops 2416 of FIG. 24b can be closed by operating switches 2418. In this way, a region of the inductive sensing loop L1 2412 that intersects with a loop 2416 can be desensitized by operating the associated switch 2418 such that the loop 2416 is closed. FIG. 24c shows the circuit of FIG. 24b with only one of the loop (loop 4) desensitized, and the other loops (loops 1 to 3 and 5) sensitized.

This difference in sensitivity, between an open loop and a closed loop, can enable a sensitivity mask to be created.

FIG. 24d shows how a mask can be formed for a whole bank of sensing elements L1 to L4 2420, the mask being electronically controlled. Inductive sensing elements L1 to L4 2420 can be sensed one at a time, and for each sensing element 2420 the loops, loop1 to loop5 can be closed in a sequence, one at a time.

At power-up, a table of frequency readings can be made by scanning every combination of sensor inputs L1 to L4, with every combination of individually closed loops, loop1 to loop5. This would give twenty readings in the example of FIG. 24. This table can act as a "no metal" reference table.

If a piece of metal, such as a stylus, is brought close to the screen, then a frequency change will be observed. If it is behind loop4, in FIG. 24d, than the frequency change will be smaller when loop4 is closed than when it is open. This shows that the stylus is behind loop4. If it was behind any other loop, then there would be no difference measured between loop4 being open or closed.

More than one metal object can, likewise, also be detected at the same time. If any metal object is behind a loop that is closed, then the signal measured will be diminished, but if, when any particular loop is closed, there is no diminution in signal measured, then there is no metal object behind that particular loop.

Instead of masking one loop at a time, all but one loop could be masked, or banks of loops could be masked at the same time, in other embodiments.

Alternative masking methods could be used. Instead of masking by closing or opening loops, grounding wire loops versus letting them float could be used, or imposing a signal on them that interferes with the sensing wires could be used.

Modes of Operation with High Power Processor

If sufficient processing power and speed is available, a masked multitouch touchscreen can be operated in a few simple modes.

By detecting many sensing inputs at the same time, and using a processor capable of operating at 100 MHz, it is possible to scan 32 inputs in 32 microseconds. With a 32 way mask, all 1024 sensing zones can be scanned in 1 ms giving a scan rate of about 1000 scans per second.

Processors capable of such power and speeds are already readily available at low cost in 2010, and future processors will greatly improve on this.

With such processors, every sensing element can be sensed continuously, creating a high scan rate proximity sensing camera.

Combining this with a touch sensor composed of a horizontal array of ITO controlling elements behind a vertical array of ITO sensing elements, (see FIG. 22) results in a simple, yet powerful multitouch touchscreen.

Very large touchscreens of 100 inch diagonal, or more, would probably involve the use of fine wire as the sensing and controlling elements (see FIG. 18). Due to the lower capacitive coupling between the x and y elements, the "maskability" of such screens is not as efficient as the situation where plate-like conductors are used. With wire, the efficiency may be as low as 25%, as opposed to 95% for plate materials. Suitable algorithms, however, will still be able to use this data to extract the information necessary to detect the accurate positions of many fingers on the screen.

Further information can, however, be obtained by scanning the touchscreen with the x elements acting as sensors and the y elements acting as controlling elements, alternating with the y elements acting as sensors, and the x elements acting as controlling elements. The results of both of these scans can then be combined. These two scans may be considered as preliminary and secondary scans.

A high power processor and controller capable of sensing several inputs at the same time is capable of scanning very large, high resolution, fine wire touchscreens several hundred times a second, enabling the touch screen to be used as a high speed multitouch touchscreen capable of detecting, and tracking, tens, if not hundreds of user inputs at the same time.

Modes of Operation with a Low Powered Processor

If a low powered processor is used, scanning all of the sensing zones all of the time greatly reduces the speed of response of the touchscreen. A complete scan of a touchscreen, with 32×32 sensing zones, involves taking 1024 measurements per scan. A processor that is capable of 50 scans per second, when used for x/y edge scanning a 32×32 way touchscreen, would only achieve three scans per second in full mask mode. This may be far too slow to track any finger movements, so more sophisticated sensing techniques are used to achieve a rapid speed of response.

Most of the methods, described below, are used to increase the functional capability of a touchscreen that uses a very simple electronic controller, and are not necessarily needed when using high power controllers.

If the x and y elements are interchangeable, that is, both can act as sensors and controllers, then, for the majority of the time, the screen can be used as a simple, edge scanning, "one touch" touchscreen. For a 32×32 resolution touchscreen, this will give about a sixteen-fold increase in speed when compared with sensing every one of the 1024 sensing zones. When two fingers are detected, as indicated by two peaks in either of the sensing arrays, then selective masking can be used around the positions indicated by the peaks to disambiguate the two true touch positions from the four possible positions indicated. If three fingers are detected, then a similar process can be used to disambiguate the true three touch positions from the nine possible positions. Similar processes can be repeated for four fingers, disambiguating 16 possible positions and five fingers or more.

The results derived from x/y multiplexed scanning can be used to determine the position of the fingers accurately, and masking can simply be used to disambiguate when more than one finger is present. In such examples, as the masking is simply being used for logic, that is, to choose between one option and another, the results of the masked scan do not have to be as precise as would be required if they were being used to precisely determine the position of the fingers. It can be possible, therefore, to save time by implementing a mask sampling scan that is fast and less precise that can be combined with the results of a x/y multiplexed scan to determine the positions of the fingers. This processing can be performed faster than determining the position of the fingers solely using a masking method.

As an alternative to edge scanning, or if the x and y elements are not interchangeable, then a selective sequence of masking (see FIG. 5) such as successive approximation masking, can be employed to speed up finger detection. Instead of selecting each of the controlling elements, one after the other, blocks of the screen can be masked off to test if the finger is in that zone or not. The first mask may detect if the finger is in the top or bottom half of the screen. If the finger is found to be in the bottom half of the screen, then the third quarter may be masked, leaving the fourth quarter unmasked. If the finger is found to be in the fourth quarter, then the seventh eighth of the screen may be masked, leaving the last eighth unmasked, and so on until the finger position is found. In this manner, the finger will be found within five scans, as opposed to 32 scans, giving about a six fold increase in detection speed.

When full-width x sensor elements are used, it may not be possible to use the y elements as sensor elements as they may be fully shielded by the x sensing layer (see FIG. 22 for example). If all of the y elements are connected to the Active Backplane signal, then the x sensor elements may be used on their own to determine if one or more of these x elements have been touched. If no elements have been touched, then x element scanning with all of the y driven elements connected to the Active Backplane signal can continue until a touch is detected. When a touch is detected, then masking can be used to determine whereabouts along each of the x elements the touch has occurred. This can be achieved by broad masking (mode 1—see below) or narrow masking (mode 2—see below).

One or more embodiments disclosed herein may operate in one or more of the following masking modes of operation.

Mode 1 (Broad Mask)—Grounding All Controlling Elements Except One.

For the example of FIG. 6 that shows an 8×8 multiplexed array, the y conductive elements can occupy the whole of the background area of the array but are split up into 8 isolated horizontal strips. The x conductive elements are in front of the y layer but isolated from it. The x elements may occupy the whole area, as in FIG. 22, or may be relatively narrow as in FIG. 6. If narrow x elements are used, then unused areas of the x layer may be left as floating isolated islands. In FIG. 22, only the x elements may be sensing, and the y elements may be used to selectively desensitize the major part of these x sensing elements.

If seven of the eight y elements are connected to ground, and the eighth element is left floating or connected to the active backplane signal, then only the parts of the x sensing elements that are in front of the ungrounded y element will be sensitive to the small grounding effect of an approaching finger. Any finger near the parts of the x sensing elements, but in front of the grounded y elements, will be almost undetectable.

The ungrounded element may, as described above, be left floating or connected to the active backplane signal. The use of the active backplane signal may be preferred, as it results in less capacitive coupling between the x sensing elements but may mean that the electronics is slightly more complex than if the y element were left floating. The fact that the y elements cover the whole area and are connected to the active backplane or ground can ensure that the whole of the rear side of the touch screen is insensitive to touch from the wrong side all of the time. If a y element were left floating, then that element would be sensitive to a finger capacitively coupling from the rear side of the screen, although that finger would affect all x elements equally, and so, not necessarily cause any problems.

Most of the time a keypad or touch screen will not be being touched, but it still needs to be ready to detect a finger approaching the screen at any time. During this "waiting" phase, all of the y elements may be connected to the Active Backplane signal such that they are enabled, and the x sensing elements can be allowed to sense the whole of the screen for a new touch. Once a touch has been detected, then the screen can be converted to a mask mode, for example by grounding all of the y elements, except one. The y element that is not grounded can be connected to the Active Backplane signal, and all x sensing elements can be scanned for every mask variation, to detect the position of any fingers.

When touching ceases, then the screen can revert back to the original mode, where all y elements are connected to the Active Backplane signal, and only the x sensing elements are scanned.

Considering the example of FIG. 2, if y3 is ungrounded (and therefore enabled) and y1, y2, and y4 to y8 are all grounded (and therefore disabled), then all of the short segments of the x elements in close proximity to y3 will be sensitive to a nearby finger. Any fingers near the segments of the x elements in close proximity to y1, y2, and y4 to y8 will be undetectable. Thus, connecting just y3 to the Active Backplane signal enables finger F0 206, at x5, to be detected as being on y3. By a similar process, when y6 is the only y element that is ungrounded, or connected to the active backplane signal, then finger F0(206) is not detectable, whereas finger F1(208) is detected at x7.

Thus, by successively un-grounding/enabling just one y element at a time, it is possible to scan a complete touch screen for many fingers, and identify the locations of the fingers without ambiguity. This scanning process can be continuously recycled to keep track of moving fingers.

Interpolation can also possible be used to determine the position of fingers between sensing elements. For example, fingers between two x sensing elements will give a small reading for both x sensing elements. Dynamic capacitance, or "Projected capacitance" touch screens and keypads, can have a thick layer of glass at the front of the touch screen, and this glass can help with interpolation between the different x elements and along the variously sensitized lengths of the x elements. A slightly conductive layer may also be used to aid interpolation by accentuating the point of contact and spreading the contact signal in a diminishing radius around the point of contact (for example as described in UK Patent 2418259.

In an example where any one of the eight y elements is ungrounded/enabled, each x element may be sensed one at a time. This would mean that 64 sensing measurements would be required to scan the complete 8×8 screen. The process can be increased in speed by sensing more than one, or even all, of the x elements at the same time. This can provide a more responsive touch screen but this requires a more complex controller.

Figure 1B:
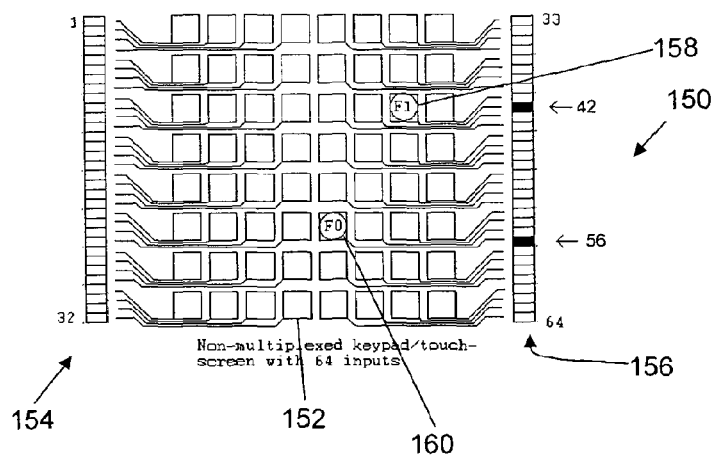

The grounding of all except one of the controlling elements (Mode 1) can be a disadvantage in terms of extra capacitive loading being placed on each of the sensing elements. In the example above, $7/8^{ths}$ of the length of all of the x sensing elements are always heavily coupled to ground. Dynamic or "Projected" capacitance is only concerned with changes in capacitance, and absolute values are not important. Therefore, any heavy capacitive coupling to ground may not significantly interfere with the sensing process. It may mean, however, that more time or processing power may be required to detect a finger than by Mode 2 (see below) or the simple, non-multiplexed, detection process of FIG. 1b.

However, there can be an advantage of the heavy ground coupling in terms of immunity of the detections system to electromagnetic interference, or at least a reduction in the effect of electromagnetic interference. The heavy ground coupling can also shield the touch screen from being activated from the wrong side.

Mode 2 (Narrow Mask)—Grounding Only One Controlling Element

An alternative to grounding all controlling elements, except one, is to ground just the one controlling element, and connect all the other controlling elements to the active backplane. This would result in the touch signal being diminished, when the finger was over the grounded element, as opposed to being enhanced as in Mode 1. The advantage of Mode 2 masking, however, is that it provides less capacitive cross coupling between the sensing elements, than Mode 1, due to the fact that the sensing elements are capacitively linked through the active backplane and not through a ground plane throughout most of the touchscreen.

Grounding one element, as opposed to grounding all except one elements, can put less load on the active backplane circuit, and allows the sensing circuit to operate faster, due to less capacitive load to ground in the system.

For an 8×8 system operating according to Mode 1, then seven eighths of the screen is grounded, whereas the same system operating according to Mode 3 will have only one eighth of the screen grounded. If a simple sensing system is used, where one sensing input is sensed at a time, and a fixed number of oscillator counts is timed, then grounded sensors will oscillate at a slower rate and, therefore, take longer to reach their target count. Grounding seven eighths of the screen exacerbates this time penalty, making the touchscreen run slower. A simple sensor mechanism may also use resistors to connect the controlling lines to the active backplane signal and grounding seven eighths of these puts a significant load on the active backplane circuit. In systems with more complex electronic controllers where more than one input is read at a time, and the active backplane is actively switched to its relevant element, there may not be any advantage of grounding one y element at a time as opposed to grounding all but one y element. The opposite may, in fact, be true as sensitizing one element at a time can provide a better mask than desensitizing one element at a time.

A Mode 2 masked touchscreen can be scanned in a similar manner to Mode 1, but the results are interpreted in a slightly different manner, due to the fact that the signal caused by the finger, or fingers that are on the masked element is attenuated, and signals caused by other fingers on the screen are left unattenuated.

When using x/y multiplexed scanning with two fingers at the same time, it can be possible to disambiguate which of the two x peaks is associated with which of the two y peaks by selectively grounding one of the two y sensing inputs that gave a touch reading, and then determining the effect of this on the two x peaks.

By grounding one of the y peaks, it's associated x peak will be desensitized, showing that the diminished x peak is associated with the y element that was grounded. The remaining, undiminished x peak is therefore associated with the other y element.

Mode 3 (Block Masking)—Grounding Several Controlling Elements at the Same Time

A group of controlling elements can be grounded, or left ungrounded, at the same time. This can be used:
1) to mask large areas of the screen rapidly, as in successive approximation masking
2) to reduce the resistance of the masking material, by paralleling up a number of neighbouring controlling elements,
3) To spread masking, when tracking a finger, in very slow systems.

Conductor Elements

The conductor materials used for the y mask/controllable elements can be made of any material that is sufficiently/reasonably conductive, such as very fine drawn or extruded metal wire, iron concrete reinforcement rods, copper tracks, conductive plate material, perforated conductive plate material, conductive wire mesh, Indium Tin Oxide (ITO) or Antimony Tin Oxide (ATO), transparent conductive printed ink such as nanoparticle, or nanotube ink, or non-transparent conductive printed ink, such as Silver or Graphite ink. Similar materials may be used for the x elements.

For mode 1 to work as effectively as possible, it may be necessary to have a very strong grounding of the x elements by the y elements. To achieve this, it can be advantageous to have a continuously conductive sheet for the layer of the controlling y elements. This creates a strong capacitive coupling between the controlling element and the sensing element. This coupling can easily reduce the sensitivity of the sensing element by about 90 to 95%. A small amount of sensitivity will still remain, but not enough to prevent the practical use of masking as a means of detecting and discriminating multiple fingers on the screen at the same time.

The x sensing elements may be a continuous conductive sheet, a reticulated conductive layer, a printed conductor, a fine conductive trace, or even a fine conductive wire.

If only a few fingers are to be detected at any one time, and several modes of masking are to be used to corroborate each other, then a maskable attenuation capability significantly less than 90% can be acceptable. Under this circumstance, fine wire, or a reticulated conductor may be used for the controllable elements of the y layer. This non-plate type of material may be situated behind the x sensing layer or in front of the sensing layer. If fine, insulation coated wire is used then, apart from where the x and y wires cross over each other, the two sets of elements may effectively be in the same plane.

Operation in mode 2 does not result in as much capacitive coupling between the x and y elements as mode 1. When used in conjunction with fine wire sensor elements, this, narrow mask mode could, however result in attenuation levels as low as 25%. Attenuation levels can be improved if the wire layout is arranged to achieve maximum capacitive coupling between the x and y elements, as shown in FIGS. 18, 19 and 20. The use of an active backplane, connected to wires while they are not sensing, ensures that capacitive cross coupling is not detrimental to the working of the screen when used in x/y mode.

Conductor Resistance

For transparent touch screens, using ITO or ATO, a surface resistivity of 300 ohms per square or less can be considered acceptable. This can allow for excellent transparency and matching/balancing of two ITO/ATO layers, and can ensure that tracks are not visible.

In one embodiment, the y elements can be very wide (FIG. 6), and can remain so across the full width (or height) of the screen. This can allow for a relatively resistive material to be used, and enable the functioning of large screens. For the majority of the time, the y elements can be simply connected to ground and do not have any fluctuating signal imposed on them. Under these circumstances there may be no, or limited, propagation delay problems associated with resistance and capacitance, and therefore the resistance can be relatively high.

In examples where the y elements are left "floating" when they are enabled and not connected to ground, the resistance of the y element can be allowed to be quite high. If the y elements are connected to the Active Backplane signal when they are not connected to ground, however, there can be a significant impairment of its effectiveness as a sensitizing mask due to RC time delays. The resistance of the y elements may need to be relatively low to prevent, or reduce, any significant resistance/capacitance (RC) delay to the Active backplane signal.

If the y elements are for control only and the x elements are for sensing only, then the x elements can be as wide as possible (see FIG. 22), and, therefore can be made of a reasonably resistive material; their resistance being offset, to some extent, by their greater width. If they are full width, however, and if the control elements are left floating when not being grounded, there can be very large capacitive coupling between the x elements and the y elements, which can cause some cross talk and sampling delays. If the y elements are connected to the active backplane when not being grounded, then the capacitance coupling is not a problem.

There is an advantage in using full width sensor elements in that large screens can be manufactured using relatively resistive material, the resistance problems being minimized by the sensor elements being as wide as possible all the way across the screen. When they are parallelled up, the resistance is reduced even further.

Resistance of the y drive elements and the x sense elements can be reduced by terminating these elements at both ends, and not just at one end as shown in the Figures. Termination at both ends effectively reduces the resistance of these elements to a quarter of their single ended termination value. Highly resistive elements lead to significant Resistance/Capacitance (RC) time delays along their length, leading to a corruption of the sensing signal and a corruption of the active backplane signal. The active backplane is most effective when it is exactly in phase with the sensing signal and any phase shift caused by RC time delays reduces its effectiveness and thereby desensitizes the sensing system. The resistance of ITO and ATO can be quite high.

A 10 inch wide by 1 inch broad track, of 300 ohms per square" ITO will have a resistance of 3000 ohms from one end to the other. If it is terminated at both ends, its greatest resistance will be 750 ohms.

As more than one element at a time is selected, especially during the early stages of successive approximation, the effective resistance of these elements is reduced since they are effectively resistors in parallel. If each has a resistance of 100 ohms and 10 are selected, then the effective resistance across the screen is reduced to 10 ohms. This reduced resistance increases the effectiveness of the mask.

The resistance of sensing and/or controlling elements can be reduced by scanning in small neighbouring groups. For example, with eight sensing elements 1 to 8, instead of sensing as 1,2,3,4,5,6,7,8, these elements may be combined together, and scanned as 1, 12, 123, 234, 345, 456, 567, 678, 78, 8. As they are on the edge, and used sometimes on their own, elements 1 and 8 can be made wider than the other elements to reduce their resistivity. The controlling elements can also be combined in a similar manner. This technique is useful when tracking a finger with a slow, low powered controller as it broadens the zone around the finger being tracked, and thereby aids the tracking of a fast moving finger.

Dual Functionality

In some embodiments, in the present disclosure, elements may have only one function: they may be sensing elements or controlling elements. In other embodiments, however, elements may have two functions: they may be sensing elements at one time and controlling elements at another time. The ability for all of the elements to have dual functionality, however, can depend on the screen material and layout. Plate type materials, such as ITO, can cause a problem if they cover too much of the screen.

Where there is a set of elements behind another set of elements, there should be sufficient gaps between elements at the front of the screen to allow fingers to be sensed by elements at the back of the screen. Reticulated material with gaps in, or fine wire elements, may not have the same problem, as they do not cover all of the screen. Therefore, reticulated material with gaps in, or fine wire elements, can be considered advantageous in some embodiments.

The use of wire only elements can enable the manufacture of a very simple screen that is paper thin, can be rolled up tight, folded and even creased without damage, and it is scalable to very large dimensions of 100 inches and much more.

It can be possible to have two separate sets of y elements: a driven/controlling set and a sensing set. The sets of elements do not necessarily have to be equal in number. When the driven set is in use, then the sensing set could be left in a high impedance mode such that the sensing set of elements is effectively non-functional. When the sensing set is in use, then the controlling set should be connected to the active backplane signal (see FIGS. 9 and 10, for example).

"No Touch" Reference Data

For each mode of detection, a "no touch" reference table may be generated, when using "projected capacitance" as a sensing method. These values may also be slowly updated by continuously comparing them with the current values, and slightly incrementing or decrementing the "no touch" values so that they slowly track the current values.

If a number of different modes are used, then a "no touch" reference table can be used for all of the modes that are to be used.

For a simple x/y edge sensing system, every x and y value is read at power up, and the values of x and y are stored as the "no touch" reference for this mode.

For Mode 1, the "no touch" reference table may be generated at power up of the touch screen, when it can be assumed that no one is touching the screen. A complete scan can be performed, with all except one y element grounded at a time, to determine a "no touch" value for each sensing location (there are 64 sensing locations for an eight by eight screen).

For Mode 2, one y element is grounded in sequence across the entire screen, and the x values measured are taken as the "no touch" reference.

For mode 3 or where more than one element is grounded at a time, then a "no touch" reference is created, at power up, for every mask possibility to be used.

Extreme Masking

One method of extreme masking is to ground all but one of the y driven elements and all but one of the x sensing elements. Such an embodiment may involve x elements that can operate as either controllable elements or sensing elements, and y elements that can operate as controllable elements. Such an embodiment will leave a small window of sensitivity on one sensing element.

Extreme masking can be used in modes 1, 2 or 3.

In another embodiment of extreme masking both the x and y elements are always used as controlling elements, and never sensing elements. A third, universal, layer is used as the single sensing element. This third layer may be sandwiched between the two masking layers. Masking can be used in Modes 1, 2, or 3

Instead of being sandwiched in the middle, the sensing layer, 2300, could be at the rear, or even at the front. If at the rear then the two masking layers could both be reticulated.

This method may not need any analogue multiplexers as there is only one sensing element. All of the other elements are driven elements and can be either connected to ground, left floating, or connected to an Active Backplane signal.

It will be appreciated that although references have been made to "x and y elements" and also "horizontal and vertical elements" herein, these terms should not be considered as limiting, and can be considered as interchangeable. The terms are considered as convenient for providing a clear description of embodiments of the invention. In some embodiments, any references to a combination of "horizontal y driven elements and vertical x sensing elements" can be considered as also covering "horizontal y sensing elements and vertical x driven elements".

In some examples, if the driven elements are made of solid plate material, then the driven elements should be behind the sensing elements so that they do not shield a user's touch from the sensing elements. In examples where layers or elements are described as being "behind" or "in front of" other layers or elements, these terms can be considered as relative to the front of the touch screen with which the user will interact.

The embodiments disclosed herein refer to touch screens with eight x elements and eight y elements. It will be appreciated this is just one example of a touch screen with which embodiments of the invention can be used, and that in practice there may be any number of x elements and any number of y elements, and also any number of inputs and outputs.

One or more embodiments disclosed herein relate to a method of achieving the unambiguous properties of a non-multiplexed array while using the small number of sensing elements of a multiplexed array. This can allow for more than one finger to be detected on a touch screen at a time with relatively few inputs. In some embodiments, it is possible to detect at least 16 fingers at the same time on an 8×8 array, using only eight sensing inputs and eight driven outputs.

One or more embodiments can utilise the fact that dynamic capacitance or "projected capacitance" detection has a very wide dynamic range, can reliably measure very small localised changes in capacitance by constantly adjusting to globally changing environmental conditions, is not primarily concerned with absolute values, and can measure the capacitance to ground of a finger. By strongly coupling most of the screen to ground, it can be possible to mask the majority of the screen to ensure that only a small part of it is sensitive to touch at any one time. Such a technique can put a heavy grounding burden on the detection system, and dynamic capacitance can be capable of detecting changes of capacitance smaller than one part in a thousand reliably, even under a heavily grounded load, and can be capable of producing usable results under these conditions.

In some embodiments, a single linear touch sensitive element, such as a piece of wire or a strip of metal, which is attached to a touch detection circuit can be considered as a dynamic capacitance detector or "projected capacitance" detector. The detector can detect changes in capacitance to ground of a nearby conductive object, or finger, and the detector can be masked from detecting such objects by placing the detecting element very close to a grounded conductive plate.

If the grounded plate is between the sensing element and the finger, and there is a hole in the grounded plate, then the finger can be detected at the place where the hole is, but not at places without a hole.

If the sensing element is between the grounded plate and the finger, and the capacitance coupling the sensing element to the grounded plate is much greater than the coupling to the finger, then the finger can be very difficult to detect. If there is a hole in the grounded plate, however, then very little desensitization will occur in that area, so, the finger can be detected by the sensing element at the place above where the hole is.

Although the detecting element can be heavily burdened with detecting the grounded plate along the majority of its length, because dynamic capacitance is concerned with changes in capacitance, and not absolute values, a finger approaching a hole in the grounded plate can be detected.

If the grounded plate is between the sensing element and the finger, then the hole can be created by leaving a part of the grounded plate electrically floating, that is, unconnected to ground. This ungrounded bit of plate will act as a floating capacitor plate and capacitively couple the finger to the sensing element.

If the sensing element is between the grounded plate and the finger, then the hole can be formed by leaving part of this plate ungrounded. Alternatively the hole can be formed by connecting that part of the plate to an active backplane signal. The active backplane signal is derived from the signal used to make the capacitive touch sensor sensitive to touch. Ideally, it has exactly the same waveform as the waveform on the touch sensor with the same amplitude, shape and phase. As it exactly tracks the waveform on the sensing element, there is, effectively, no capacitive coupling between the plate and the sensing element. This makes the touch sensitive element appear to have nothing behind it, and makes it appear as though there is a hole, or window, in the grounded plate behind the touch sensor. Therefore, the touch sensor remains touch sensitive at this spot, although it is not touch sensitive along the rest of its length where it is still strongly capacitively coupled to the grounded plate.

This window can be electronically moved along the touch sensor by having a series of grounded plates behind the touch sensor, with one of them at a time, in a sequence, being selected to be left floating or connected to the Active Backplane (ABP) signal. This sequence can be continuously repeated, so the movement of many fingers on a linear sensor can be detected and tracked.

The grounded plate can be widened to cover an array of linear sensing elements, and the hole can be replaced by a wide slit across its full width. In this way it is possible to create a mask that can scan many sensing elements at the same time. Such a mask is shown in FIG. 3. The dark portion of the sensing element indicates where it is touch sensitive. A mask prevents these elements being touch sensitive. As an open window in the mask moves up the sensing array different parts of the sensing elements become touch sensitive while previously sensitive parts lose their sensitivity. So, a finger can only be detected when it is touching, or in very close proximity, to the window in the mask. If there are eight sensing elements and eight positions for the window in the mask, then 64 fingers can be detected. This is analogous to the situation of detection by the 64 input non-multiplexed array in FIG. 1b, but using only eight sensing inputs. This arrangement can be scaled up to form very large sensing arrays, detecting many fingers, but with relatively few inputs.

Although multitouch involves many fingers touching the screen at the same time, most of the time the screen will not be being touched at all, or will be used for single touch. Occasionally it will also be used for two touch and less commonly for all ten or more touches.

By changing the function of the y elements from grounded/ungrounded outputs to sensing inputs, it is possible to convert the multi-touch touch screen into a standard high speed single-touch touch screen.

This can involve the x elements being narrow enough to allow some capacitive sensing by the y elements through the x layer to the finger approaching the front of the screen.

In some examples, it can be possible to put the screen into a simple one touch mode most of the time and use the results detected by this to switch into two, or multi-touch mode as required. An advantage of this functionality is that much less processing power is used in single touch mode and the scan rate is much faster. One multi-touch scan can take at least 4 times longer than a single touch scan, and could take ten times longer. Therefore the more intensive multi-touch scanning can only be implemented when required, thereby providing a more efficient and responsive touch screen.

If a single touch is detected, as shown by a single x and y peak, then the system can stay in the single touch mode. As soon as two touches or more are detected, as shown by two or more peaks in the x and/or y scans, then the system can switch to two-touch or multi-touch mode.

As x/y multiplexed scanning is much faster and more sensitive than masked scanning, it can be possible to run in x/y multiplexed mode most of the time and simply use masking occasionally, as and when needed, or at regular intervals, to disambiguate the data resulting from the use of multiplexed scanning.

Disambiguation of multiplex scanning (mode 2) results need not necessarily use a full "mask" scan. The multiplex scanned results will already have indicated where the fingers are, so one or more of those positions alone may be masked to eliminate ambiguities. With two fingers, only one masked sensor reading is necessary to disambiguate the situation. This functionality can be performed in less than 1 ms thereby providing a responsive touch screen.

The results derived from x/y multiplexed scanning can be used to determine the position of the fingers accurately, and masking can simply be used to disambiguate when more than one finger is present. In such examples, as the masking is simply being used for logic, that is to choose between one option and another, the results of the masked scan do not have to be as precise as if they were being used to precisely determine the position of the fingers. It can be possible, therefore, to save time by implementing a mask sampling scan that is fast and less precise that can be combined with the results of a x/y multiplexed scan to determine the positions of the fingers. This processing can be performed faster than determining the position of the fingers solely using a masking method.

One or more embodiments of the invention can be defined by the following numbered clauses.

1) An electronic switch, for a capacitance touch proximity sensing element, which can inhibit touch proximity sensing or allow touch proximity sensing, under electronic control, by either, strongly capacitively coupling the sensing element to ground in order to inhibit touch sensing, or by coupling the sensing element to an active backplane signal, derived from, or common to the sensing signal, in order to allow touch sensing.

2) An electronic switch, for a capacitance touch proximity sensing element, which can inhibit touch proximity sensing or allow touch proximity sensing, under electronic control, by either, strongly capacitively coupling the sensing element to ground in order to inhibit touch sensing, or by electronically removing the link that was strongly capacitively coupling the sensing element to ground, in order to allow touch sensing.

3) A series of switches, as in clause 1, which are placed side by side and are used as a mask to allow selected parts of a linear capacitance touch proximity sensing element to detect touch and inhibit other parts from detecting touch.

4) A series of switches, as in clause 1, which are placed side by side and used as a mask to inhibit most of a linear capacitance touch proximity sensing element from detecting touch, but, under electronic control, allowing one switch at a time to "open" in order to allow touch sensing in a linear sequence from one end of the sensing element to the other.

5) A series of switches, as in clause 2, which are placed side by side and used as a mask to inhibit most of a linear capacitance touch proximity sensing element from detecting touch, but, under electronic control, allowing one switch at a time to "open" in order to allow touch sensing in a linear sequence from one end of the sensing element to the other.

6) A series of switches, as in clause 4, that are wide enough to mask an array of linear capacitance touch proximity sensing elements, the switches being placed side by side and used as a mask to inhibit most of a linear capacitance touch proximity sensing elements from detecting touch, but, under electronic control, allowing one switch at a time to "open" in order to create a wide, thin window, covering all the touch sensing elements, that allows touch sensing in a linear sequence from one end of each of the sensing elements to the other.

7) A series of switches, as in clause 5, that are wide enough to mask an array of linear capacitance touch proximity sensing elements, the switches being placed side by side and used as a mask to inhibit most of a linear capacitance touch proximity sensing elements from detecting touch, but, under electronic control, allowing one switch at a time to "open" in order to create a wide, thin window, covering all the touch sensing elements, that allows touch sensing in a linear sequence from one end of each of the sensing elements to the other.

8) A series of switches, as in clause 1, which are placed side by side and used as a mask to allow most of a linear capacitance touch proximity sensing element to detect touch, but, under electronic control, allowing one switch at a time to "close" in order to inhibit touch sensing in selected parts of the sensing element.

9) A series of switches, as in clause 2, which are placed side by side and used as a mask to allow most of a linear capacitance touch proximity sensing element to detect touch, but, under electronic control, allowing one switch at a time to "close" in order to inhibit touch sensing in selected parts of the sensing element.

10) A series of switches, as in clause 8, that are wide enough to mask an array of linear capacitance touch proximity sensing elements, the switches being placed side by side and used as a mask to allow most of a linear capacitance touch proximity sensing elements to detect touch, but, under electronic control, allowing one switch at a time to "close" in order to create a wide, thin window, covering all the touch sensing elements, that inhibits touch sensing in selected parts of the sensing elements.

11) A series of switch and sensing elements as in clause 6, wherein the switch elements and the sensing elements are effectively invisible to the operator, and used as a touchscreen for operation with one finger at a time, or many fingers at the same time.

12) A series of switch and sensing elements as in clause 7, wherein the switch elements and the sensing elements are effectively invisible to the operator, and used as a touchscreen for operation with one finger at a time, or many fingers at the same time.

13) A series of switch and sensing elements, used as a touchscreen, as in clause 11, wherein the switch elements have an alternative function as sensing elements.

14) A series of switch and sensing elements as in clause 11, where there is a second set of sensing elements, parallel to the switch elements and orthogonal to the existing sensing elements, this second set of sensing elements functioning alternately to the switch elements.

15) A series of switch and sensing elements, used as a touchscreen, as in clause 13, wherein both sets of elements act as sensors for the majority of the time but one set changes to switches, under electronic control, when more than one finger is detected.

16) A series of switch and sensing elements as in clause 13, wherein one set of elements alternately act as sensors then switches.

17) A series of switch and sensing elements as in clause 11, wherein both sets of elements can change from sensing to switching and vice versa.

18) A series of switch and sensing elements as in clause 16, wherein the sensing and switching elements are both fine wire.

19) A series of switch and sensing elements as in clause 17, wherein the sensing and switching elements are both fine wire.

20) A series of switching and sensing elements as in clauses 16 and 17, wherein a pattern of wiring is used in order to maximise the capacitive cross coupling between the x and y sensor elements.

21) A series of switches, as in clause 4, that are wide enough to mask an array of linear capacitance touch proximity sensing elements, the switches being placed side by side and used as a mask to inhibit most of a linear capacitance touch proximity sensing elements from detecting touch, but, under electronic control, allowing one switch at a time to "open" in order to create a wide, thin window, covering all the touch sensing elements, that allows touch sensing in a pre-selected order.

22) A series of switches, as in clause 4, that are wide enough to mask an array of linear capacitance touch proximity sensing elements, the switches being placed side by side and used as a mask to inhibit most of a linear capacitance touch proximity sensing elements from detecting touch, but, under electronic control, allowing several switches at a time to "open" in order to create a wide window, covering all the touch sensing elements, that allows touch sensing in a pre-selected order.

23) A series of switches, as in clause 8, that are wide enough to mask an array of linear capacitance touch proximity sensing elements, the switches being placed side by side and used as a mask to allow most of a linear capacitance touch proximity sensing elements to detect touch, but, under electronic control, allowing several switches at a time to "close" in order to create a wide window, covering all the touch sensing elements, that inhibits touch sensing in selected parts of the sensing elements.

24) A touchscreen, as in clause 11, in which the switched y elements and the sensing x elements are made of Indium Tin Oxide or Antimony Tin Oxide.

25) A touchscreen, as in clause 12, in which the switched y elements and the sensing x elements are made of Indium Tin Oxide or Antimony Tin Oxide.

26) A touchscreen, as in clause 11, in which the switched y elements are made of Indium Tin Oxide or Antimony Tin Oxide, and the sensing x elements are made of fine wire.

27) A touchscreen, as in clause 12, in which the switched y elements are made of Indium Tin Oxide or Antimony Tin Oxide, and the sensing x elements are made of fine wire.

27) A touchscreen, as in clause 11, in which the touchscreen operates most of the time in a single touch x/y multiplexed mode, but switches to a multiple touch mode when two or more fingers are detected.

28) A touchscreen, as in clause 12, in which the touchscreen operates most of the time in a single touch x/y multiplexed mode, but switches to a multiple touch mode when two or more fingers are detected.

29) A touchscreen, as in clause 11, in which the touchscreen operates most of the time in a single touch x/y multiplexed mode, but switches to a second mode when two or three touches are detected and to a third mode when more than three fingers are detected.

31) A touchscreen, as in clause 12, in which the touchscreen operates most of the time in a single touch x/y multiplexed mode, but switches to a second mode when two or three touches are detected and to a third mode when more than three fingers are detected.

32) A series of switches, as in clause 22, that are wide enough to mask an array of linear capacitance touch proximity sensing elements, the switches being placed side by side and used as a mask to inhibit most of a linear capacitance touch proximity sensing elements from detecting touch, but, under electronic control, allowing several switches at a time to "open" in order to create a wide window, covering all the touch sensing elements, that allows touch sensing in an order that constitutes successive approximation.

33) A touchscreen as in clause 24 in which the y driven elements are full height for the whole width across the screen and the x sensing elements are full width for the full height up the screen.

34) A touchscreen consisting of one sensing element that has a horizontal touch inhibiting mask behind it and a vertical touch inhibiting mask in front of it, wherein the two masks can be scanned in various orders and with various opening widths to enable various parts of the touch sensing element to detect the position of a touch.

The invention claimed is:
1. A capacitive touch sensor comprising:
one or more sensing elements; and
controllable elements, wherein regions of the controllable elements are proximal to regions of the one or more sensing elements in order to provide sensing regions of the one or more sensing elements, wherein the controllable elements are configured to be controlled such that the sensing regions are either sensitized or desensitized, and
wherein the touch sensor is configured to distinguish between the locations of multiple user inputs by connecting one or more of the controllable elements to ground or an anti-active backplane in order to desensi- tize one or more corresponding sensing regions of the one or more sensing elements.

2. The touch sensor of claim 1, wherein at least a portion of one or more of the sensing elements is configured to be coupled to ground to be desensitized.

3. The touch sensor of claim 2, wherein at least a portion of one or more of the sensing elements is configured to be coupled to an active backplane signal to be sensitized.

4. The touch sensor of claim 2, wherein at least a portion of one or more of the sensing elements is configured to be coupled to an element that is electrically floating to be sensitized.

5. The touch sensor of claim 1, wherein the one or more sensing elements are aligned in a different direction to the controllable elements such that the sensing elements and controllable elements intersect in order to provide the sensing region.

6. The touch sensor of claim 5, wherein the direction of the one or more sensing elements is substantially perpendicular to the direction of the one or more controllable elements.

7. The touch sensor of claim 1, wherein at least part of the one or more sensing elements is aligned in substantially the same direction as, and proximal to, at least part of one or more of the controllable elements in order to provide the sensing region.

8. The touch sensor of claim 1, wherein the touch sensor is configured to leave a controllable element electrically floating in order to sensitize the corresponding sensing regions.

9. The touch sensor of claim 8, further comprising a switch configured to couple a controllable element to ground in order to desensitize the corresponding sensing regions, or leave the controllable element electrically floating to sensitize the corresponding sensing regions.

10. The touch sensor of claim 9, comprising a switch for each controllable element.

11. The touch sensor of claim 9, wherein the switch, or switches, is/are electronic switches.

12. The touch sensor of claim 11, further comprising a controller, configured to operate the switch, or switches, in accordance with information received from one or more of the sensing elements.

13. The touch sensor of claim 12, wherein the controller is configured to determine which of the controllable elements should be controlled in order to distinguish between multiple user inputs represented by the signals returned from one or more of the sensing elements.

14. The touch sensor of claim 13, wherein the controller is configured to control a controllable element in order to desensitize a previously sensitized corresponding sensing region that corresponds to a location of one of multiple user inputs.

15. The touch sensor of claim 12, wherein the controller is configured to control the controllable elements in order to sensitize all of the sensing elements, and the controller is then configured to repeatedly:
receive information from the sensing elements; and
in response to the information received from the sensing elements, control the controllable elements in order to desensitize corresponding sensing regions until multiple user input is distinguishable.

16. The touch sensor of claim 12, wherein the controller is configured to control the controllable elements such that all of the sensing elements are sensitized when no user input, or a single user input, is received.

17. The touch sensor of claim 12, wherein the controller is configured to implement a mode of operation in accordance with the information received from the one or more sensing elements.

18. The touch sensor of claim 8, further comprising a switch configured to couple one of the controllable elements to an anti-active backplane signal in order to desensitize the corresponding sensing region, or leave the controllable element electrically floating to sensitize the corresponding sensing regions.

19. The touch sensor of claim 1, wherein the touch sensor is configured to couple a controllable element to an active backplane signal in order to sensitize the corresponding sensing regions.

20. The touch sensor of claim 19, further comprising a switch configured to couple a controllable element to ground in order to desensitize the corresponding sensing regions, or couple the controllable element to the active backplane signal to sensitize the corresponding sensing regions.

21. The touch sensor of claim 19, further comprising a switch configured to couple a controllable element to an anti-active backplane signal in order to desensitize the corresponding sensing regions, or couple the controllable element to the active backplane signal to sensitize the corresponding sensing regions.

22. The touch sensor of claim 1, further comprising a controller, wherein the controller is configured to periodically control the controllable elements such that each controllable element in turn is configured to desensitize corresponding sensing regions.

23. The touch sensor of claim 22, wherein the controller is configured to connect the one or more controllable elements to an anti-active backplane signal in turn.

24. The touch sensor of claim 1, further comprising a controller, wherein the controller is configured to periodically control the controllable elements such that each controllable element in turn is configured to sensitize corresponding sensing regions.

25. The touch sensor of claim 1, wherein one or more of the sensing elements are configured as controllable elements and/or one or more of the controllable elements are configured as sensing elements.

26. The touch sensor of claim 25, wherein all of the sensing elements are also configured as controllable elements, and the touch sensor including a controller is configured to control the controllable elements such that a single sensing region between two controllable elements is configured to be touch sensitive.

27. The touch sensor of claim 1, wherein the sensing elements and controllable elements are wire elements.

28. The touch sensor of claim 27, wherein the wire elements are zig-zagged in that the wires double back on themselves.

29. The touch sensor of claim 1, wherein the elements are configured to determine user input using projected capacitance.

30. The touch sensor of claim 1, comprising a wire connected to one or more of the elements, and a shield provided in proximity to the wire such that the wire is not sensitive to touch.

31. The touch sensor of claim 30, wherein the shield is a grounded wire.

32. The touch sensor of claim 1, wherein at least a portion of one or more of the sensing elements is configured to be coupled to an anti-active backplane signal in order to be desensitized.

33. The touch sensor of claim 32, wherein at least a portion of one or more of the sensing elements is configured to be coupled to an active backplane signal to be sensitized.

34. The touch sensor of claim 33, further comprising a switch configured to couple the sensing element to either the active backplane signal or the anti-active backplane signal.

35. The touch sensor of claim 1, further comprising a switch configured to couple one or more of the sensing elements to the anti-active backplane signal or to an element that is electrically floating.

36. The touch sensor of claim 1, configured to connect a controllable element to an anti-active backplane signal in order to desensitize a corresponding sensing region.

37. The touch sensor of claim 1, wherein a portion of a sensing element follows a path that is substantially parallel to, and substantially adjacent to, a portion of a controllable element in a region of the touch sensor such that the portions of the sensing element and controllable element that correspond with each other provide sensing regions.

38. The touch sensor of claim 1, wherein the one or more sensing elements are made of fine insulation coated wire and the controllable elements are made of plate-type material.

39. The touch sensor of claim 38, wherein the plate-type material comprises one of ITO, ATO, copper foil, conductive printed ink, or a perforated conductor or mesh.

40. The touch sensor of claim 1, wherein the one or more sensing elements and controlling elements each comprise plate-type material.

41. The touch sensor of claim 40, wherein the plate-type material comprises one of ITO, ATO, copper foil, conductive printed ink, or a perforated conductor or mesh.

42. The touch sensor of claim 1 wherein the one or more sensing elements and/or controllable elements each comprises a wire.

43. A capacitive touch sensor comprising:
one or more elements;
wherein at least a portion of the one or more elements is configured to be desensitized in order to distinguish between the locations of multiple user inputs, wherein the elements comprise one or more sensing elements, wherein at least a portion of one or more of the sensing elements is configured to be coupled to ground to be desensitized, and
wherein at least a portion of one or more of the sensing elements is configured to be coupled to an active backplane signal to be sensitized, further comprising a switch configured to couple the sensing element to either ground or the active backplane.

44. A capacitive touch sensor comprising:
one or more elements;
wherein at least a portion of the one of more elements is configured to be desensitized in order to distinguish between the locations of multiple user inputs, wherein the elements comprise one or more sensing elements, wherein at least a portion of one or more of the sensing elements is configured to be coupled to ground to be desensitized, and wherein at least a portion of one or more of the sensing elements is configured to be coupled to an element that is electrically floating to be sensitized, further comprising a switch configured to couple the sensing element to ground or to an element that is electrically floating.

45. A capacitive touch sensor comprising:
one or more elements;
wherein at least a portion of the one or more elements is configured to be desensitized in order to distinguish between the locations of multiple user inputs, wherein the elements comprise one or more sensing elements, and wherein at least a portion of one or more of the sensing elements is configured to be coupled to ground to be desensitized, further comprising one or more controllable elements, wherein a region of a controllable element is proximal to a region of a sensing element in order to provide a sensing region of the sensing element, wherein the one or more controllable elements are configured to be controlled such that the sensing regions are either sensitized or desensitized.

46. A capacitive touch sensor comprising:
one or more elements comprising a first set of one or more elements and a second set of one or more elements, wherein both the first set and second set of elements are configured to be operable as both sensing and controlling elements, wherein at least a portion of the one or more elements is configured to be desensitized in order to distinguish between the locations of multiple user inputs; and
a controller configured to:
determine preliminary locations of the multiple user inputs using the first set of elements as sensing elements and the second set of elements as controllable elements,
determine secondary locations of the multiple user inputs using the first set of elements as controllable elements and the second set of elements as sensing elements, and
determine composite location locations of the the multiple user inputs in accordance with the preliminary locations and the secondary locations.

47. An electronic device comprising the touch sensor according to claim 1.

48. A method of operating the touch sensor of claim 1, the method comprising:
controlling the controllable elements such that the sensing regions are either sensitized or desensitized, and
desensitizing the sensing regions of the one or more sensing elements in order to determine the location of one or more user inputs.

49. A capacitive touch sensor comprising:
one or more elements; wherein at least a portion of the one or more elements is configured to be desensitized in order to distinguish between the locations of multiple user inputs, wherein the elements comprise one or more sensing elements, wherein at least a portion of one or more of the sensing elements is configured to be coupled to an anti-active backplane signal to be desensitized, a n d wherein at least a portion of one or more of the sensing elements is configured to be coupled to an active backplane signal to be sensitized, further comprising a switch configured to couple the sensing element to either the anti-active backplane signal or the active backplane signal.

50. A capacitive touch sensor comprising:
one or more elements; wherein at least a portion of the one or more elements is configured to be desensitized in order to distinguish between the locations of multiple user inputs, wherein the elements comprise one or more sensing elements, and wherein at least a portion of one or more of the sensing elements is configured to be coupled to an anti- active backplane signal to be desensitized, wherein at least a portion of one or more of the sensing elements is configured to be coupled to an element that is electrically floating to be sensitized, further comprising a switch configured to couple the sensing element to the anti- active backplane signal or to the element that is electrically floating.

51. A capacitive touch sensor comprising:
one or more sensing elements; and
controllable elements, wherein regions of the controllable elements are proximal to regions of the one or more sensing elements in order to provide sensing regions of the one or more sensing elements, wherein the controllable elements are configured to be controlled such that the sensing regions are either sensitized or desensitized, wherein the one or more sensing elements and/or controllable elements each comprises a wire.

* * * * *